(12) United States Patent
Zhang

(10) Patent No.: US 11,434,367 B2
(45) Date of Patent: Sep. 6, 2022

(54) POLYPHENYLENE ETHER RESIN, RESIN COMPOSITION INCLUDING THE SAME AND ARTICLE MADE THEREFROM

(71) Applicant: Elite Electronic Material (KunShan) Co., Ltd., Kunshan (CN)

(72) Inventor: Yan Zhang, Kunshan (CN)

(73) Assignee: ELITE ELECTRONIC MATERIAL (KUNSHAN) CO., LTD., Kunshan (CN)

(*) Notice: Subject to any disclaimer, the term of this patent is extended or adjusted under 35 U.S.C. 154(b) by 197 days.

(21) Appl. No.: 17/070,538

(22) Filed: Oct. 14, 2020

(65) Prior Publication Data
US 2022/0049094 A1 Feb. 17, 2022

(30) Foreign Application Priority Data
Aug. 13, 2020 (CN) .......................... 202010811632.1

(51) Int. Cl.
*C08L 51/00* (2006.01)
*C08L 71/12* (2006.01)
*C08J 5/24* (2006.01)
*C08L 25/06* (2006.01)

(52) U.S. Cl.
CPC ............... *C08L 71/126* (2013.01); *C08J 5/24* (2013.01); *C08L 25/06* (2013.01); *C08L 51/003* (2013.01); *C08L 2203/16* (2013.01); *C08L 2203/20* (2013.01); *C08L 2312/00* (2013.01)

(58) Field of Classification Search
CPC .... C08F 212/08; C08F 212/18; C08F 212/12; C08F 212/24; C08F 283/08; C08L 51/003
See application file for complete search history.

(56) References Cited

U.S. PATENT DOCUMENTS

2009/0012331 A1* 1/2009 Nakano ................. C07C 41/16
568/658
2015/0218326 A1* 8/2015 Kitai ....................... B32B 15/14
428/221

FOREIGN PATENT DOCUMENTS

DE 3526549 A1 * 7/1985

* cited by examiner

*Primary Examiner* — Mark S Kaucher
(74) *Attorney, Agent, or Firm* — Muncy, Geissler, Olds & Lowe, P.C.

(57) ABSTRACT

A polyphenylene ether resin of Formula (1) and a resin composition including the polyphenylene ether resin of Formula (1) are provided. The resin composition is useful for making different articles, including a prepreg, a resin film, a laminate or a printed circuit board, which may achieve excellent multi-layer board thermal resistance and excellent height of impact whitening, in addition to the desirable properties such as fully dissolvable varnish, absence of branch-like pattern or dry board on laminate appearance, high glass transition temperature, low dissipation factor, low Z-axis ratio of thermal expansion and high copper foil peeling strength.

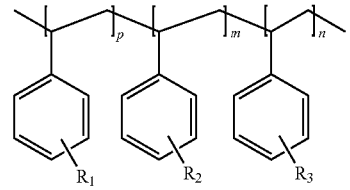

16 Claims, 3 Drawing Sheets

POLYPHENYLENE ETHER RESIN, RESIN COMPOSITION INCLUDING THE SAME AND ARTICLE MADE THEREFROM

CROSS-REFERENCE TO RELATED APPLICATION

This application claims the priority benefits of China Patent Application No. 202010811632.1, filed on Aug. 13, 2020. The entirety the above-mentioned patent application is hereby incorporated by reference herein and made a part of this specification.

BACKGROUND

1. Field of the Disclosure

The present disclosure relates to a polyphenylene ether resin, a resin composition comprising the same and an article made therefrom and more particularly to a polyphenylene ether resin and a resin composition comprising the same useful for preparing an article such as a prepreg, a resin film, a laminate and a printed circuit board.

2. Description of Related Art

Recently, with the rapid advancement in electronic industry, electronic products are developed toward the trend of miniaturization, thin type, light weight, high density assembly and high functionality, which drives the development of printed circuit board (PCB) fabrication toward high trace density and multi-layer boards. High trace density of PCB requires high pattern precision, small aperture, and narrow distance between conductive lines of boards, which demands on high surface uniformity, low dielectric properties, high dimensional stability and so on of laminates. Multi-layer configuration of PCB requires high multi-layer board thermal resistance and high impact resistance of laminates.

Conventionally, to achieve low dielectric properties, polyphenylene ether resins were usually chosen to make laminates and printed circuit boards. However, conventional polyphenylene ether resins fail to meet the growing demands of high surface uniformity, high multi-layer board thermal resistance and high impact resistance at the same time.

Accordingly, there is an urgent need in the present technical field to develop a novel resin material having high surface uniformity, low dielectric properties, high dimensional stability, high multi-layer board thermal resistance and high impact resistance.

SUMMARY

In view of the problems facing prior arts, the present disclosure provides a polyphenylene ether resin, having a comb-shaped structure of Formula (1):

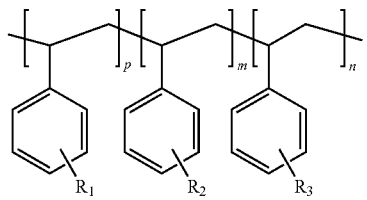

Formula (1)

wherein m, n and p are individually an integer of 0-100, m+n+p=2-100, and at least two of m, n and p are not 0 at the same time;

$R_1$ to $R_3$ are individually a hydrogen atom, a C1-C6 hydrocarbyl group or a structure of Formula (2), and at least one of $R_1$ to $R_3$ is the structure of Formula (2):

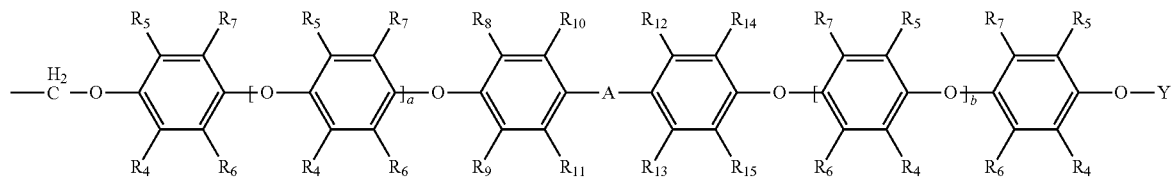

Formula (2)

$R_4$ to $R_{15}$ are individually a hydrogen atom or a C1-C6 alkyl group; A is a covalent bond or a C1-C3 hydrocarbyl group; a and b are individually an integer of 1-30;

Y is Formula (3), Formula (4) or Formula (5):

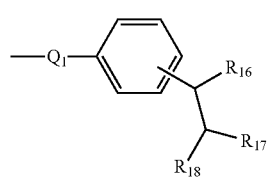

Formula (3)

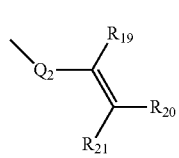

Formula (4)

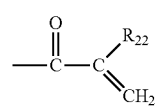

Formula (5)

wherein $R_{16}$ to $R_{22}$ are individually a hydrogen atom or a C1-C6 alkyl group; $Q_1$ and $Q_2$ are individually a C1-C6 hydrocarbyl group or not present.

Specifically, the polyphenylene ether resin of Formula (1) comprises any one of Formulas (6)-(12) or a combination thereof:

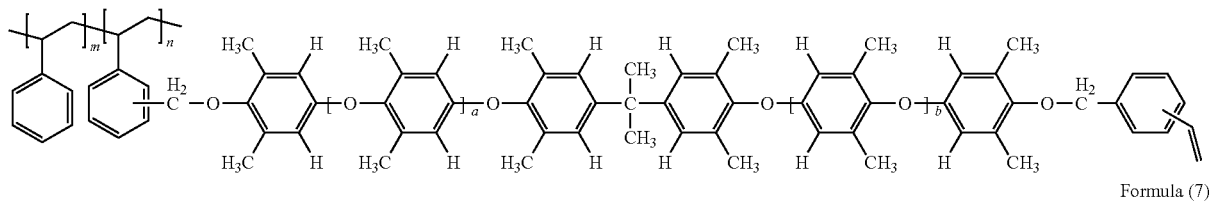
Formula (6)

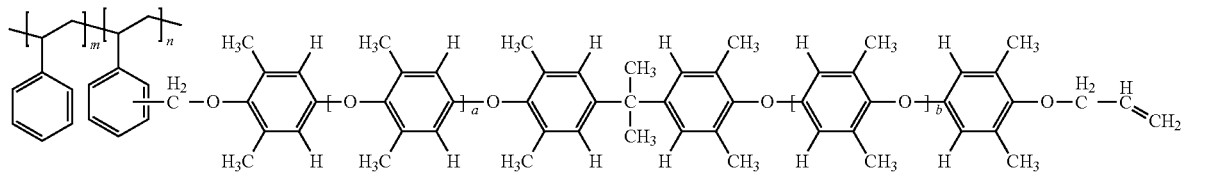
Formula (7)

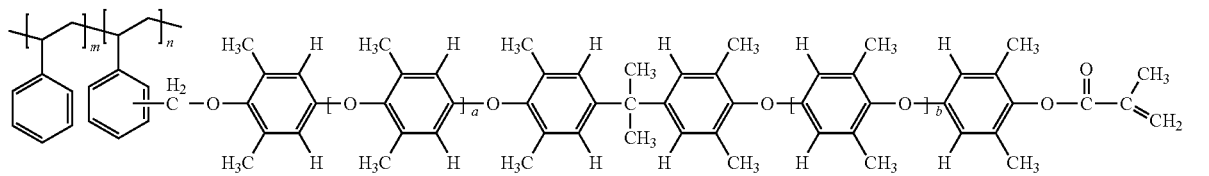
Formula (8)

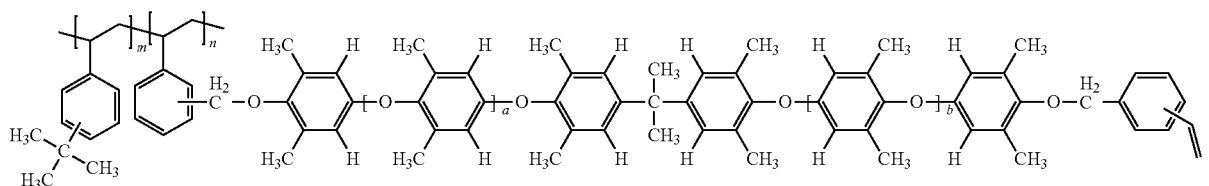
Formula (9)

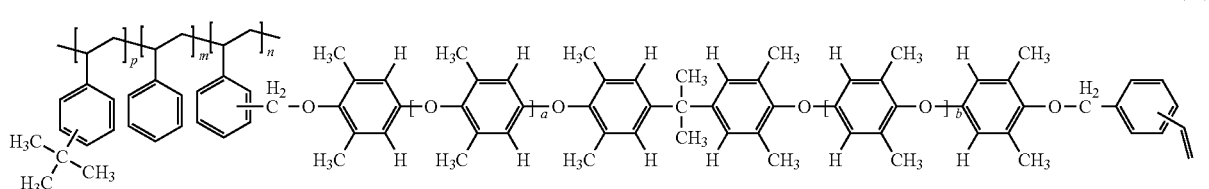
Formula (10)

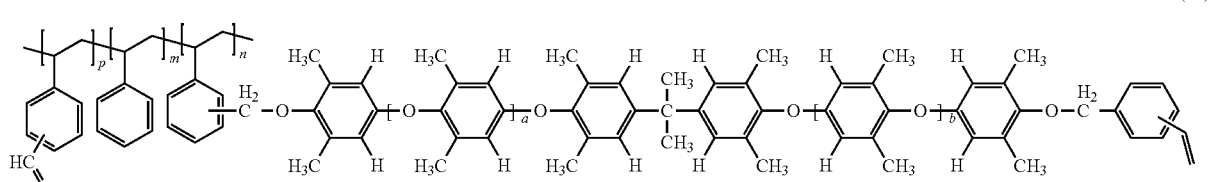
Formula (11)

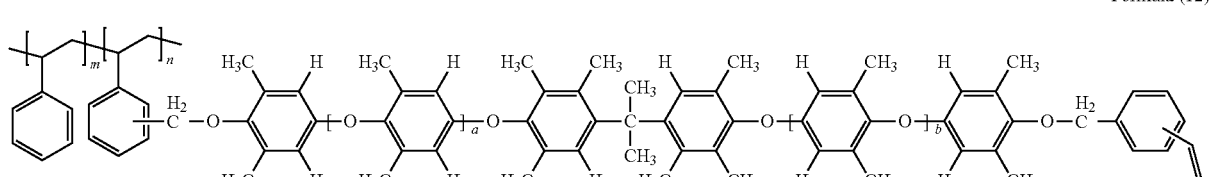
Formula (12)

wherein m, n and p are individually an integer of 0 to 100; in Formula (6), Formula (7), Formula (8) and Formula (12), m≠0, n≠0, and m+n=2-100; in Formula (9), p≠0, n≠0, and n+p=2-100; in Formula (10) and Formula (11), m≠0, p≠0, n≠0, and m+n+p=3-100; and a and b are individually an integer of 1 to 30.

Also disclosed herein is a method of preparing the polyphenylene ether resin of Formula (1), comprising the following steps:

1) subjecting a styrene and/or a styrene derivative and a methyl styrene halide to a free radical polymerization reaction to obtain an olefin copolymer;

2) subjecting the olefin copolymer obtained from step 1) and a bishydroxyl-terminated polyphenylene ether resin to a halogenation reaction to obtain a hydroxyl-terminated comb-shaped polyphenylene ether resin; and
3) reacting the hydroxyl-terminated comb-shaped polyphenylene ether resin obtained from step 2) with a vinyl-containing halide to obtain the polyphenylene ether resin of Formula (1);
the styrene derivative comprises a C1-C6 hydrocarbyl group substituted styrene; the bishydroxyl-terminated polyphenylene ether resin has a structure of Formula (13):

Also disclosed herein is a resin composition comprising 100 parts by weight of the polyphenylene ether resin of Formula (1) and 10-40 parts by weight of a crosslinking agent.

Specifically, the crosslinking agent comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate, polyolefin, maleimide resin or a combination thereof.

Formula (13)

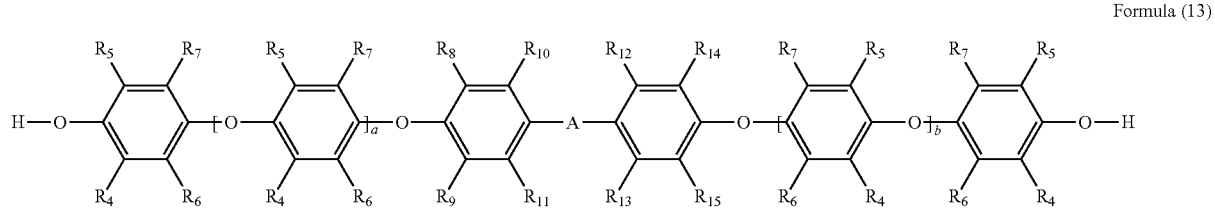

wherein $R_4$ to $R_{15}$ are individually a hydrogen atom or a C1-C6 alkyl group; A is a covalent bond or a C1-C3 hydrocarbyl group; a and b are individually an integer of 1-30;
the vinyl-containing halide is a halide having a structure of Formula (3), Formula (4) or Formula (5):

Formula (3)

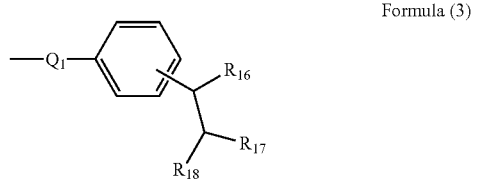

Formula (4)

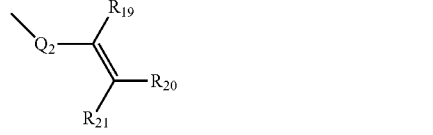

Formula (5)

wherein $R_{16}$ to $R_{22}$ are individually a hydrogen atom or a C1-C6 alkyl group; $Q_1$ and $Q_2$ are individually a C1-C6 hydrocarbyl group or not present.

Specifically, in step 1), a molar ratio of the styrene and/or the styrene derivative to the methyl styrene halide is 20:1 to 1:1; the molar ratio of the bishydroxyl-terminated polyphenylene ether resin in step 2) to the methyl styrene halide in step 1) is 0.5:1 to 5:1; and the molar ratio of the vinyl-containing halide in step 3) to the bishydroxyl-terminated polyphenylene ether resin in step 2) is 5:1 to 1:1.

Specifically, an initiator, a molecular weight regulator and a solvent are added in step 1); a phase transfer catalyst, a solvent and an alkaline solution are added in step 2); an antioxidant and an alkaline solution are added in step 3); and a reaction temperature of the method of preparing the polyphenylene ether resin of Formula (1) is 50-100° C., a reaction time of step 1) is 2-12 hours, and a reaction time of step 2) and step 3) is independently 1-8 hours.

Specifically, the resin composition comprises 1-100 parts by weight of an additive relative to 100 parts by weight of the polyphenylene ether resin of Formula (1), wherein the additive comprises benzoxazine resin, cyanate ester resin, organic silicone resin, epoxy resin, active ester, phenolic resin, styrene maleic anhydride resin, amine curing agent, polyamide, polyimide or a combination thereof.

Specifically, the resin composition may further comprise flame retardant, inorganic filler, curing accelerator, polymerization inhibitor, solvent, silane coupling agent, surfactant, coloring agent, toughening agent or a combination thereof.

The present disclosure also provides an article made from the resin composition according to any embodiment described above, which comprises a prepreg, a resin film, a laminate or a printed circuit board.

Specifically, a glass transition temperature of the article as measured by using a dynamic mechanical analyzer by reference to IPC-TM-650 2.4.24.4 is greater than or equal to 210° C.

Specifically, no delamination occurs after subjecting the article to a multi-layer board thermal resistance test by reference to IPC-TM-650 2.4.13.1.

Specifically, a Z-axis ratio of thermal expansion of the article as measured by using a thermomechanical analyzer by reference to IPC-TM-650 2.4.24.5 is less than or equal to 2.2%.

Specifically, a dissipation factor of the article at 10 GHz as measured by reference to JIS C2565 is less than or equal to 0.0017.

Specifically, a height of impact whitening of the article as measured by using a drop hammer impact tester is greater than or equal to 13 cm.

Specifically, a copper foil peeling strength of the article as measured by using a tensile strength tester by reference to IPC-TM-650 2.4.8 is greater than or equal to 3.0 lb/in.

DESCRIPTION OF THE EMBODIMENTS

Figure 1:
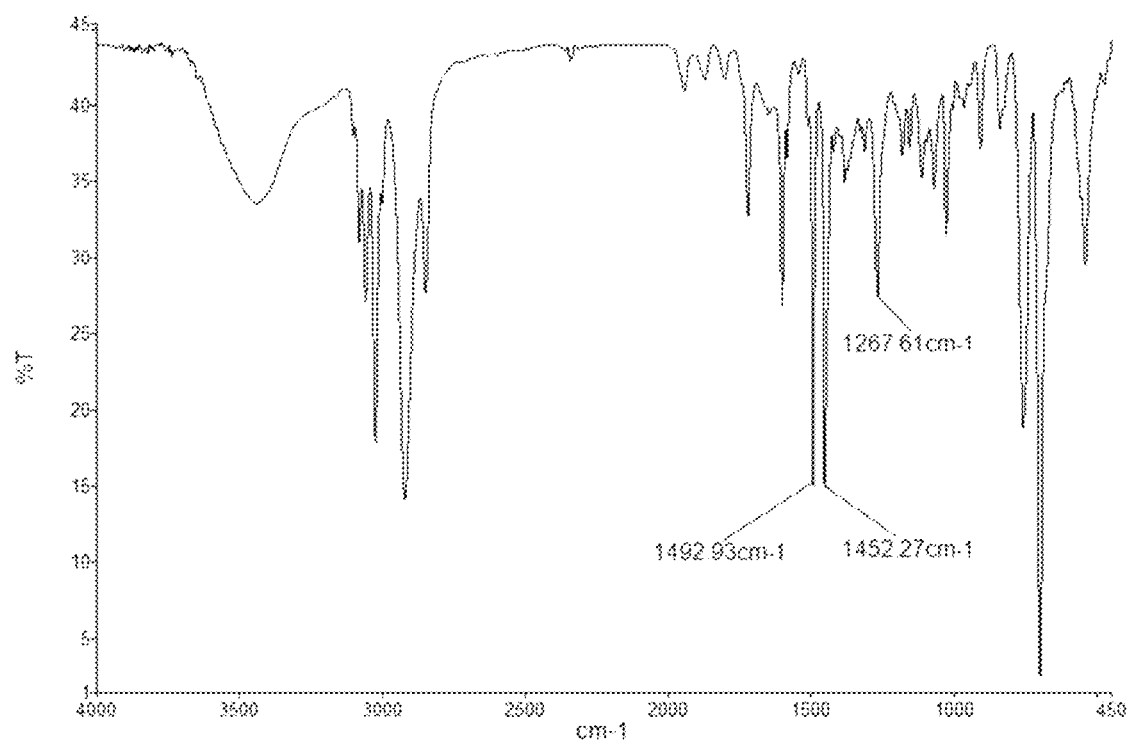
FIG. 1 illustrates the FTIR spectrum of copolymer B1, which is a copolymer of styrene and chloromethylstyrene.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompass," "encompassing," "comprises," "comprising," "includes," "including," "has," "having" or any other variant thereof is construed as an open-ended transitional phrase intended to cover a non-exclusive inclusion. For example, a composition or an article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of" "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" is a widely used common name of a synthetic polymer and is construed in the present disclosure as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, in the present disclosure, the term "vinyl-containing" is construed to encompass the inclusion of a vinyl group, a vinylene group, an allyl group, a (meth)acrylate group or a combination thereof.

Unless otherwise specified, according to the present disclosure, when the term acrylate is expressed as (meth) acrylate, it is intended to comprise both situations of containing and not containing a methyl group; for example, (meth)acrylate is construed as including acrylate and methacrylate.

Unless otherwise specified, an alkyl group, an alkenyl group and a hydrocarbyl group described herein are construed to encompass various isomers thereof. For example, a propyl group is construed to encompass n-propyl and iso-propyl.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

The present disclosure provides a polyphenylene ether resin of Formula (1):

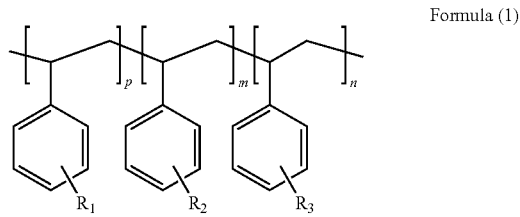

Formula (1)

wherein the polyphenylene ether resin has a comb-shaped structure, which has a main chain based on the olefin copolymer and a side chain based on the polyphenylene ether resin;

wherein m, n and p are individually an integer of 0-100, m+n+p=2-100, and at least two of m, n and p are not 0 at the same time; preferably, m+n+p=10-80, and at least two of m, n and p are not 0 at the same time; more preferably, m+n+p=20-60, and at least two of m, n and p are not 0 at the same time. $R_1$ to $R_3$ are individually a hydrogen atom, a C1-C6 hydrocarbyl group or a structure of Formula (2), and at least one of $R_1$ to $R_3$ is the structure of Formula (2):

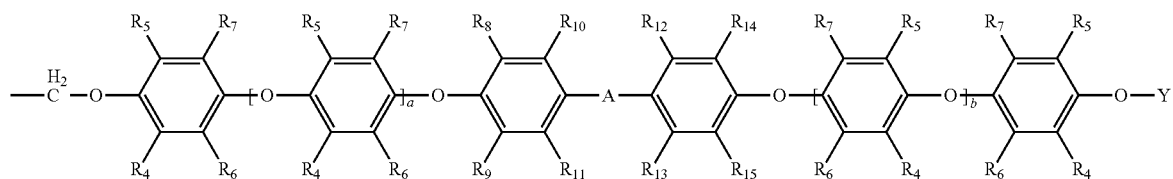

Formula (2)

Preferably, $R_1$ to $R_3$ are individually a hydrogen atom, a tert-butyl group, a vinyl group or a structure of Formula (2), and at least one of $R_1$ to $R_3$ is the structure of Formula (2).

$R_4$ to $R_7$ are individually a hydrogen atom or a C1-C6 alkyl group; preferably, $R_4$ and $R_5$ are each a methyl group, and $R_6$ and $R_7$ are each a hydrogen atom. $R_8$ to $R_{15}$ are individually a hydrogen atom or a C1-C6 alkyl group; preferably, $R_8$ to $R_{15}$ are individually a hydrogen atom or a methyl group; for example, $R_8$ to $R_{10}$ and $R_{13}$ to $R_{15}$ are each a methyl group, $R_{11}$ and $R_{12}$ are each a hydrogen atom; for example, $R_8$, $R_9$, $R_{14}$ and $R_{15}$ are each a methyl group, and $R_{10}$ to $R_{13}$ are each a hydrogen atom; for example, $R_8$ to $R_{15}$ are each a hydrogen atom. A is a covalent bond or a C1-C3 hydrocarbyl group; preferably, A is a covalent bond, —CH$_2$— or —C(CH$_3$)$_2$—. a and b are individually an integer of 1 to 30, preferably an integer of 1 to 20, and more preferably an integer of 5 to 15.

Y is Formula (3), Formula (4) or Formula (5):

Formula (3)
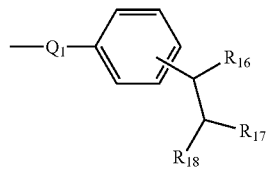

Formula (4)
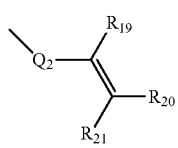

Formula (5)
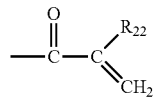

wherein $R_{16}$ to $R_{22}$ are individually a hydrogen atom or a C1-C6 alkyl group; preferably, $R_{16}$ to $R_{22}$ are individually a hydrogen atom or a methyl group. $Q_1$ and $Q_2$ are individually a C1-C6 hydrocarbyl group or not present; preferably, $Q_1$ and $Q_2$ are individually a methylene group (—$CH_2$—) or not present;

in some embodiments, the polyphenylene ether resin of Formula (1) comprises a polyphenylene ether resin of Formula (6), a polyphenylene ether resin of Formula (7), a polyphenylene ether resin of Formula (8), a polyphenylene ether resin of Formula (9), a polyphenylene ether resin of Formula (10), a polyphenylene ether resin of Formula (11), a polyphenylene ether resin of Formula (12) or a combination thereof:

Formula (6)
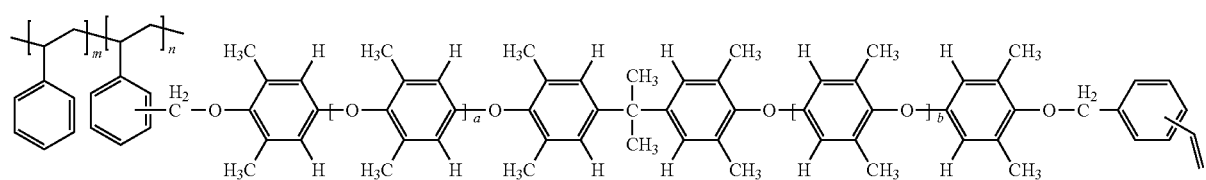

Formula (7)
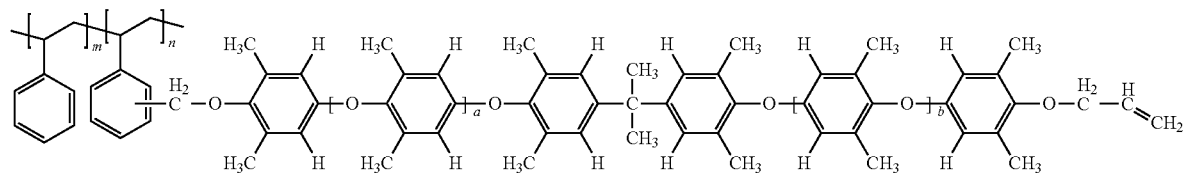

Formula (8)
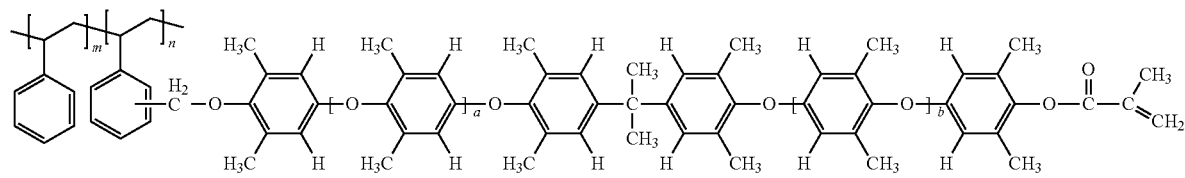

Formula (9)
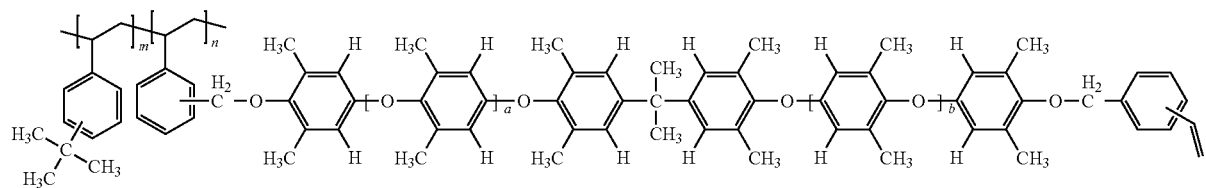

Formula (10)
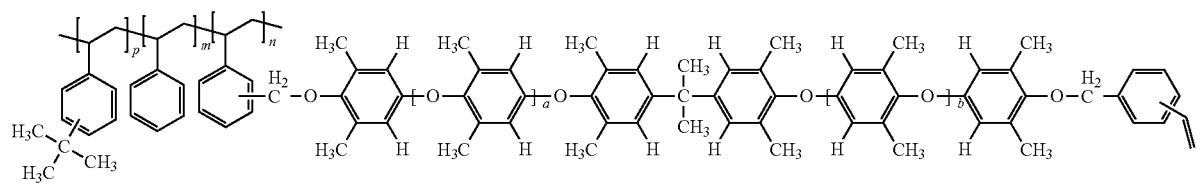

Formula (11)

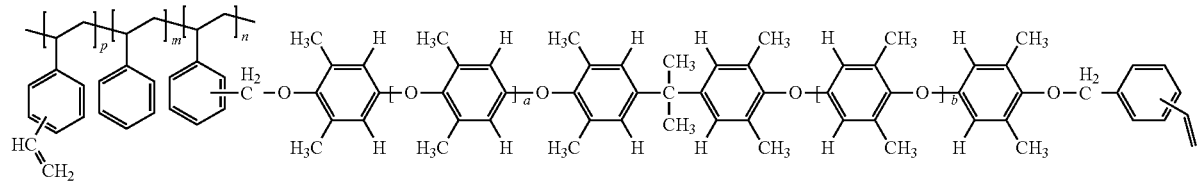

Formula (12)

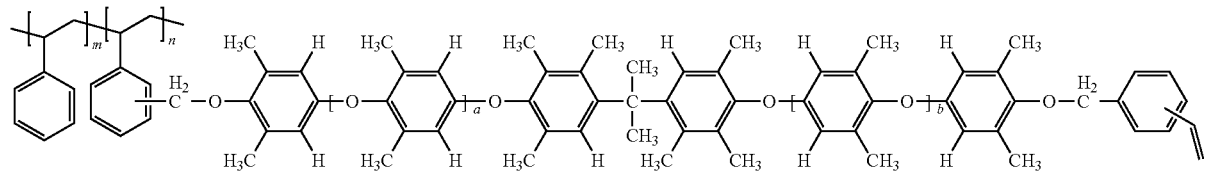

wherein Formula (6), Formula (7), Formula (8) and Formula (12) represent the situation of p=0, m≠0 and in Formula (1); in Formula (6), Formula (7), Formula (8) and Formula (12), m+n=2-100, preferably m+n=20-60. Formula (9) represents the situation of m=0, p≠0 and in Formula (1); in Formula (9), n+p=2-100, preferably n+p=20-60. Formula (10) and Formula (11) represent the situation of m≠0, p≠0 and n≠0 in Formula (1); in Formula (10) and Formula (11), m+n+p=3-100, preferably m+n+p=20-60. a and b are individually an integer of 1 to 30, preferably an integer of 1 to 20, and more preferably an integer of 5 to 15.

The polyphenylene ether resin of Formula (1) according to the present disclosure is prepared by the following steps: step 1) subjecting a styrene and/or a styrene derivative and a methyl styrene halide to a free radical polymerization reaction to obtain an olefin copolymer; step 2) subjecting the olefin copolymer obtained from step 1) and a bishydroxyl-terminated polyphenylene ether resin to a halogenation reaction to obtain a hydroxyl-terminated comb-shaped polyphenylene ether resin; and step 3) reacting the hydroxyl-terminated comb-shaped polyphenylene ether resin obtained from step 2) with a vinyl-containing halide to obtain the polyphenylene ether resin of Formula (1) terminated by a vinyl-containing group.

The styrene is not particularly limited and may comprise various commercial products. The styrene derivative is not particularly limited and may comprise, but not limited to, various C1-C6 hydrocarbyl group substituted styrenes known in the field to which this disclosure pertains. Preferably, the styrene derivative may comprise, but not limited to, tert-butylstyrene, divinylbenzene or a combination thereof.

The methyl styrene halide is not particularly limited and is preferably a methyl styrene chloride, including but not limited to 4-chloro-methyl styrene, 3-chloro-methyl styrene, 2-chloro-methyl styrene or a combination thereof.

The bishydroxyl-terminated polyphenylene ether resin has a structure of Formula (13):

Formula (13)

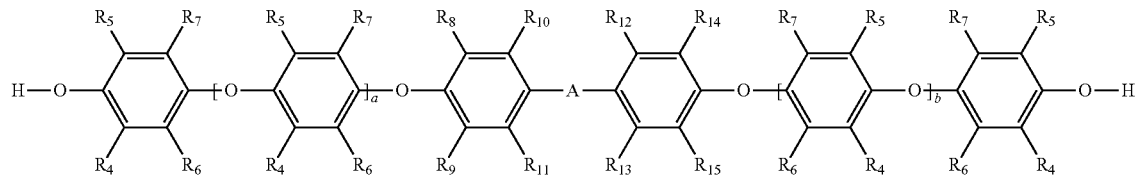

wherein $R_4$ to $R_7$ are individually a hydrogen atom or a C1-C6 alkyl group; preferably, $R_4$ and $R_5$ are each a methyl group, and $R_6$ and $R_7$ are each a hydrogen atom. $R_8$ to $R_{15}$ are individually a hydrogen atom or a C1-C6 alkyl group; preferably, $R_8$ to $R_{15}$ are individually a hydrogen atom or a methyl group; for example, $R_8$ to $R_{10}$ and $R_{13}$ to $R_{15}$ are each a methyl group, $R_{11}$ and $R_{12}$ are each a hydrogen atom; for example, $R_8$, $R_9$, $R_{14}$ and $R_{15}$ are each a methyl group, and $R_{10}$ to $R_{13}$ are each a hydrogen atom; for example, $R_8$ to $R_{15}$ are each a hydrogen atom. A is a covalent bond or a C1-C3 hydrocarbyl group, wherein the hydrocarbyl group comprises a branched chain hydrocarbyl group (e.g., alkyl group) or a cyclic hydrocarbyl group (e.g., cycloalkyl group); preferably, A is a covalent bond, —$CH_2$— or —$C(CH_3)_2$—. a and b are individually an integer of 1 to 30, preferably an integer of 1 to 20, and more preferably an integer of 5 to 15.

The bishydroxyl-terminated polyphenylene ether resin may comprise any one or more commercial products or products synthesized by the Applicant, examples including but not limited to the bishydroxyl-terminated polyphenylene ether resin available from Sabic (such as SA90), the biphenyl-bridged bishydroxyl-terminated polyphenylene ether resin PPO-A prepared in the Preparation Example 8 described below or a combination thereof.

Preferably, the vinyl-containing halide is a vinyl-containing chloride. For example, the vinyl-containing halide may be, but not limited to, chloromethylstyrene, vinyl chloride, allyl chloride, acryloyl chloride, methacryloyl chloride or a combination thereof.

In step 1), a ratio of the styrene and/or the styrene derivative to the methyl styrene halide is not particularly limited; for example, a molar ratio of the styrene and/or the styrene derivative to the methyl styrene halide may be 20:1 to 1:1, such as but not limited to 20:1, 15:1, 10:1, 5:1 or 1:1.

In step 1), if the styrene and the styrene derivative are both present, a ratio of the styrene to the styrene derivative is not particularly limited; for example, a molar ratio of the styrene to the styrene derivative may be 10:1 to 1:10, such as but not limited to 1:10, 1:8, 1:6, 1:4, 1:2, 1:1, 2:1, 4:1, 6:1, 8:1 or 10:1.

Optionally, the reaction temperature of step 1) is controlled between 50 and 100° C., and the reaction time is controlled from 2 to 12 hours.

Optionally, in step 1), a proper amount of solvent is added, such as but not limited to ketone (e.g., acetone or methyl ethyl ketone), toluene or a combination thereof, preferably toluene.

Optionally, in step 1), an initiator is added, such as but not limited to a peroxide capable of producing free radicals, and examples may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy)phthalate, di(t-butyl peroxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butyl cyclohexyl) peroxydicarbonate or a combination thereof.

Optionally, in step 1), a molecular weight regulator is added, such as but not limited to n-butyl mercaptan, dodecyl mercaptan, mercaptoacetic acid, mercaptopropanoic acid, mercaptoethanol, 2,4-diphenyl-4-methyl-1-pentene, piperidine-based nitroxide radical compound or a combination thereof, preferably 2,4-diphenyl-4-methyl-1-pentene.

In step 2), the amount of the bishydroxyl-terminated polyphenylene ether resin is not particularly limited; for example, based on the amount of the methyl styrene halide in step 1), a molar ratio of the bishydroxyl-terminated polyphenylene ether resin to the methyl styrene halide may be 0.5:1 to 5:1, such as but not limited to 0.5:1, 0.6:1, 0.7:1, 0.8:1, 0.9:1, 1:1, 2:1 or 5:1.

Optionally, the reaction temperature of step 2) is controlled between 50 and 100° C., and the reaction time is controlled from 1 to 8 hours.

Optionally, in step 2), a proper amount of solvent is added, such as but not limited to ketone (e.g., acetone or methyl ethyl ketone), toluene or a combination thereof, preferably toluene.

Optionally, in step 2), a phase transfer catalyst is added, such as but not limited to tetrabutylammonium bromide.

Optionally, in step 2), an alkaline solution is added, such as but not limited to sodium hydroxide solution, potassium hydroxide solution, triethylamine, potassium tert-butoxide or a combination thereof, preferably sodium hydroxide solution.

In step 3), the amount of the vinyl-containing halide is not particularly limited; for example, based on the amount of the bishydroxyl-terminated polyphenylene ether resin in step 2), a molar ratio of the vinyl-containing halide to the bishydroxyl-terminated polyphenylene ether resin may be 5:1 to 1:1, such as but not limited to 5:1, 4:1, 3:1, 2:1, 1.5:1, 1:1 or 0.5:1.

Optionally, the reaction temperature of step 3) is controlled between 50 and 100° C., and the reaction time is controlled from 1 to 8 hours.

Optionally, in step 3), an antioxidant is added, such as but not limited to hydroquinone, p-benzoquinone, tert-butyl hydroquinone, 4,4'-butylidenebis (6-t-butyl-3-methylphenol), 2,2'-methylenebis(4-ethyl-6-t-butylphenol), 4-methoxy phenol or a combination thereof, preferably tert-butyl hydroquinone.

Optionally, in step 3), an alkaline solution is added, such as but not limited to sodium hydroxide solution, potassium hydroxide solution, triethylamine, potassium tert-butoxide or a combination thereof, preferably sodium hydroxide solution.

The present disclosure also provides a resin composition, comprising:

(A) a polyphenylene ether resin of Formula (1); and
(B) a crosslinking agent.

Unless otherwise specified, according to the resin composition of the present disclosure, the amount of each component contained in the resin composition is represented as the amount relative to a total of 100 parts by weight of the polyphenylene ether resin of Formula (1), and the amount of the crosslinking agent is not particularly limited. For example, but not limited thereto, relative to a total of 100 parts by weight of the polyphenylene ether resin of Formula (1), the total amount of the crosslinking agent may be 10 parts by weight to 40 parts by weight or 10 parts by weight to 30 parts by weight.

The crosslinking agent used in the present disclosure is not particularly limited and may include any one or more crosslinking agent monomers, polymers or a combination thereof useful for making a prepreg, a resin film, a laminate, or a printed circuit board. The crosslinking agent of the present disclosure preferably comprises a vinyl-containing monomer, its polymer, or a combination thereof. For example, but not limited thereto, the crosslinking agent may comprise 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate, polyolefin, maleimide resin or a combination thereof. These components should be construed as including their modifications.

The 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole and acrylate suitable for the present disclosure are not particularly limited and may comprise various commercially available products.

The polyolefin suitable for the present disclosure is not particularly limited and may include any one or more polyolefins suitable for preparing a prepreg, a resin film, a laminate or a printed circuit board, such as but not limited to styrene-butadiene-divinylbenzene terpolymer, hydrogenated styrene-butadiene-divinylbenzene terpolymer, styrene-butadiene-maleic anhydride terpolymer, hydrogenated styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, polybutadiene (homopolymer of butadiene), maleic anhydride-butadiene copolymer, polymethylstyrene or a combination thereof. These components should be construed as including their modifications.

The maleimide resin suitable for the present disclosure is not particularly limited and may include any one or more maleimide resins useful for preparing a prepreg, a resin film, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide (a.k.a. bis-(3-ethyl-5-methyl-4-maleimidephenyl)methane), 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

In addition to the aforesaid components, the resin composition may optionally further comprise an additive, such as benzoxazine resin, cyanate ester resin, organic silicone resin, epoxy resin, active ester, phenolic resin, styrene maleic anhydride resin, amine curing agent, polyamide, polyimide or a combination thereof. These components should be construed as including their modifications.

Unless otherwise specified, relative to a total of 100 parts by weight of the polyphenylene ether resin of Formula (1), the additive described above may range from 1 part by weight to 100 parts by weight, and the ratio therebetween can be adjusted according to the need.

Examples of the benzoxazine resin suitable for the present disclosure are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, vinyl-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof. For example, the benzoxazine resin may be, but not limited to, LZ-8270, LZ-8280, LZ-8290 or LPY 11051 available from Huntsman, PF-3500 available from Chang Chun Plastics or HFB-2006M available from Showa High Polymer.

The cyanate ester resin suitable for the present disclosure is not particularly limited and may be any cyanate ester resin with an Ar—O—C≡N structure, wherein Ar represents a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin, or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name primaset PT-15, PT-30S, PT-60S, BA-200, BA-230S, BA-3000S, BTP-2500, BTP-6020S, DT-4000, DT-7000, ULL-950S, HTL-300, CE-320, LUT-50 or LeCy sold by Lonza.

The organic silicone resin suitable for the present disclosure may be any organic silicone resins known in the field to which this disclosure pertains, including but not limited to polyalkylsiloxane, polyarylsiloxane, polyalkarylsiloxane, modified polysiloxane or a combination thereof. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow Corning Co., Ltd., amino-modified organic silicone resins XF42-05742, XF42-C6252 and XF42-05379 available from Momentive Performance Materials JAPAN LLC, or a combination thereof.

The epoxy resin suitable for the present disclosure may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may comprise DOPO-containing phenol novolac epoxy resin, DOPO-containing cresol novolac epoxy resin, DOPO-containing bisphenol-A novolac epoxy resin, or a combination thereof; the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

The active ester suitable for the present disclosure may be any active polyester resins known in the field to which this disclosure pertains, including but not limited to various commercially available active polyester resin products. Examples include, but not limited to, active polyester resin products HPC-8000 and HPC-8150 available from D.I.C. Corporation.

The phenolic resin suitable for the present disclosure may comprise, but not limited to, mono-functional, bifunctional or multifunctional phenolic resin, comprising phenolic resin of a resin composition conventionally useful for making prepregs, such as phenoxy resin, phenol novolac resin, etc.

In the styrene maleic anhydride resin suitable for the present disclosure, the ratio of styrene (S) to maleic anhydride (MA) may be for example 1/1, 2/1, 3/1, 4/1, 6/1, 8/1 or 12/1, examples including styrene maleic anhydride resins such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

The amine curing agent may include, but not limited to, diamino diphenyl sulfone, diamino diphenyl methane, diamino diphenyl ether, diamino diphenyl sulfide, dicyandiamide or a combination thereof.

The polyamide may be any polyamide resin known in the field to which this disclosure pertains, including but not limited to various commercially available polyamide resin products.

The polyimide may be any polyimide resin known in the field to which this disclosure pertains, including but not limited to various commercially available polyimide resin products.

In addition to the aforesaid components, the resin composition disclosed herein may optionally further comprise flame retardant, inorganic filler, curing accelerator, polymerization inhibitor, solvent, silane coupling agent, surfactant, coloring agent, toughening agent or a combination thereof.

The flame retardant suitable for the present disclosure may be any one or more flame retardants useful for preparing a prepreg, a resin film, a laminate or a printed circuit board, examples including but not limited to bromine-containing flame retardant or phosphorus-containing flame retardant, the bromine-containing flame retardant preferably comprising decabromodiphenyl ethane, and the phosphorus-containing flame retardant preferably comprising: ammonium polyphosphate, hydroquinone bis-(diphenyl phosphate), bisphenol A bis-(diphenylphosphate), tri(2-carboxyethyl) phosphine (TCEP), phosphoric acid tris (chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

The inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite (AlOOH), calcined talc, talc, silicon nitride, calcined kaolin or a combination thereof. Moreover, the inorganic filler can be spherical (including solid sphere or hollow sphere), fibrous, plate-like, particulate, sheet-like or whisker-like and can be optionally pretreated by a silane coupling agent.

The curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoyl peroxy)hexane, lauroyl peroxide, t-hexyl peroxypivalate, dibutylperoxy isopropylbenzene, bis(4-t-butylcyclohexyl) peroxydicarbonate or a combination thereof.

As used herein, the polymerization inhibitor is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof more specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent to the resin composition according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methylpyrrolidone, or a mixture thereof.

The silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of adding surfactant to the resin composition according to the present disclosure is to ensure uniform distribution of the inorganic filler in the resin composition.

The coloring agent suitable for the present disclosure may comprise, but not limited to, dye or pigment.

The purpose of toughening agent used herein is to improve the toughness of the resin composition. The toughening agent may comprise, but not limited to, carboxyl-terminated butadiene acrylonitrile rubber (CTBN rubber).

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

In one embodiment, by well mixing the resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. to 220° C. and preferably between 200° C. to 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly containing a copper foil, the prepreg, the inner layer circuit board, the prepreg and a copper foil stacked in said order by heating at 190 to 220° C. for 90 to 180 minutes to cure the insulation material of the prepregs. Next, black oxidation, drilling, copper plating and other known circuit board processes are performed on the outmost copper foil so as to obtain the printed circuit board.

In one or more embodiments, the resin composition of the present disclosure and various articles made therefrom may preferably have any one, more or all of the following properties.

In one embodiment, a varnish prepared from the resin composition of the present disclosure may be completely dissolved at 5-35° C. and will not cause turbidity or layer separation.

In one embodiment, a laminate made from the resin composition of the present disclosure is absence of branch-like pattern or dry board on its appearance.

In one embodiment, the glass transition temperature as measured by using a dynamic mechanical analyzer by reference to IPC-TM-650 2.4.24.4 is greater than or equal to 210° C., such as between 210° C. and 230° C.

In one embodiment, no delamination occurs after subjecting the article to a multi-layer board thermal resistance test by reference to IPC-TM-650 2.4.13.1.

In one embodiment, the ratio of thermal expansion in Z-axis as measured by using a thermomechanical analyzer by reference to IPC-TM-650 2.4.24.5 is less than or equal to 2.2%, such as between 1.8% and 2.2%.

In one embodiment, the dissipation factor at 10 GHz as measured by reference to JIS C2565 is less than or equal to 0.0017, such as between 0.0015 and 0.0017.

In one embodiment, the height of impact whitening as measured by using a drop hammer impact tester is greater than or equal to 13 cm, such as between 13 cm and 20 cm.

In one embodiment, the copper foil peeling strength as measured by using a tensile strength tester by reference to IPC-TM-650 2.4.8 is greater than or equal to 3.0 lb/in, such as between 3.1 lb/in and 3.7 lb/in.

Raw materials below were used to prepare the resin compositions of various Examples (Table 1 and Table 2) and Comparative Examples (Table 3) of the present disclosure and further fabricated to prepare test samples or articles.

The names of reagents used in the Examples and Comparative Examples are as follows:
1. polyphenylene ether resin of Formula (1), A1 to A8, prepared by the Applicant.
2. conventional polyphenylene ether resin: bishydroxyl-terminated polyphenylene ether resin, product name SA90, available from SABIC.
3. conventional polyphenylene ether resin: vinylbenzyl-terminated polyphenylene ether resin, product name OPE-2st 2200, available from Mitsubishi Gas Chemical Co., Inc.
4. conventional polyphenylene ether resin: methacrylate-terminated polyphenylene ether resin, product name SA9000, available from SABIC.
5. olefin copolymer A9 and A10: prepared by the Applicant.
6. butadiene-styrene copolymer: product name Ricon100, available from Cray Valley.
7. triallyl isocyanurate: product name TAIC, available from Kingyorker Enterprise Co., Ltd.
8. 1,2-bis(vinylphenyl)ethane: product name BVPE, available from Linchuan Chemical Co., Ltd.
9. inorganic filler: spherical silica, product name SC2500-SVJ, available from Admatechs.
10. curing accelerator: 2,5-dimethyl-2,5-di(t-butylperoxy)-3-hexyne, product name 25B, available from NOF Corporation.
11. solvent: methyl ethyl ketone (MEK), available from Sinopec Group.

Components prepared by the Applicant used in the Examples and the Comparative Examples correspond to the products obtained from Preparation Example 1 to Preparation Example 10.

Preparation Example 1 Synthesis of Polyphenylene Ether Resin A1

Step 1): 4.84 g (0.02 mol) of dibenzoyl peroxide (BPO) was weighed and loaded to a three-necked flask; 200 g of toluene was added and stirred until BPO was fully dissolved, followed by adding 104 g (1.0 mol) of styrene, 15.3 g (0.1 mol) of chloromethylstyrene and a small amount of molecular weight regulator 2,4-diphenyl-4-methyl-1-pentene and continuously stirring, and the reaction was conducted at constant temperature in a 90° C. oil bath with $N_2$ protection for 5 hours. $N_2$ was released upon completion and the reaction was cooled to room temperature. The solution was subject to reduced pressure distillation to remove the solvent toluene and unreacted raw materials and then precipitated in methanol. The solid obtained was subject to suction filtration and dried to obtain white solid powder, which is copolymer B1, a copolymer of styrene and chloromethylstyrene.
Step 2): The synthesized product B1 was all added to a three-necked flask, followed by adding 400 g of toluene and stirring to fully dissolve the copolymer, and then 184 g of a bishydroxyl-terminated polyphenylene ether resin (SA90) and 24 g of a phase transfer catalyst tetrabutylammonium bromide were added, stirred and fully dissolved. The reaction was conducted under stirring at constant temperature in a 70° C. oil bath with $N_2$ protection, and 20 g of 20% NaOH solution was added dropwise, followed by another 2 hours of reaction at constant temperature and then the temperature was lowered to 40° C.
Step 3): 19.9 g of chloromethylstyrene and 0.5 g of an antioxidant tert-butyl hydroquinone were added to the three-necked flask and continuously stirred. The reaction was conducted at constant temperature in a 60° C. oil bath with $N_2$ protection, and 20 g of 20% NaOH solution was added dropwise, followed by another 1.5 hours of reaction at constant temperature. $N_2$ was released upon completion and the reaction was cooled to room temperature. The solution was neutralized with dilute hydrochloric acid and centrifuged to remove the water phase. The organic phase was precipitated in methanol. The solid obtained was subject to suction filtration and dried to obtain pale tangerine yellow solid powder, which is polyphenylene ether resin A1, having a structure of Formula (6), wherein m+n=20-60, and a and b are individually an integer of 1 to 30.

Figure 2:
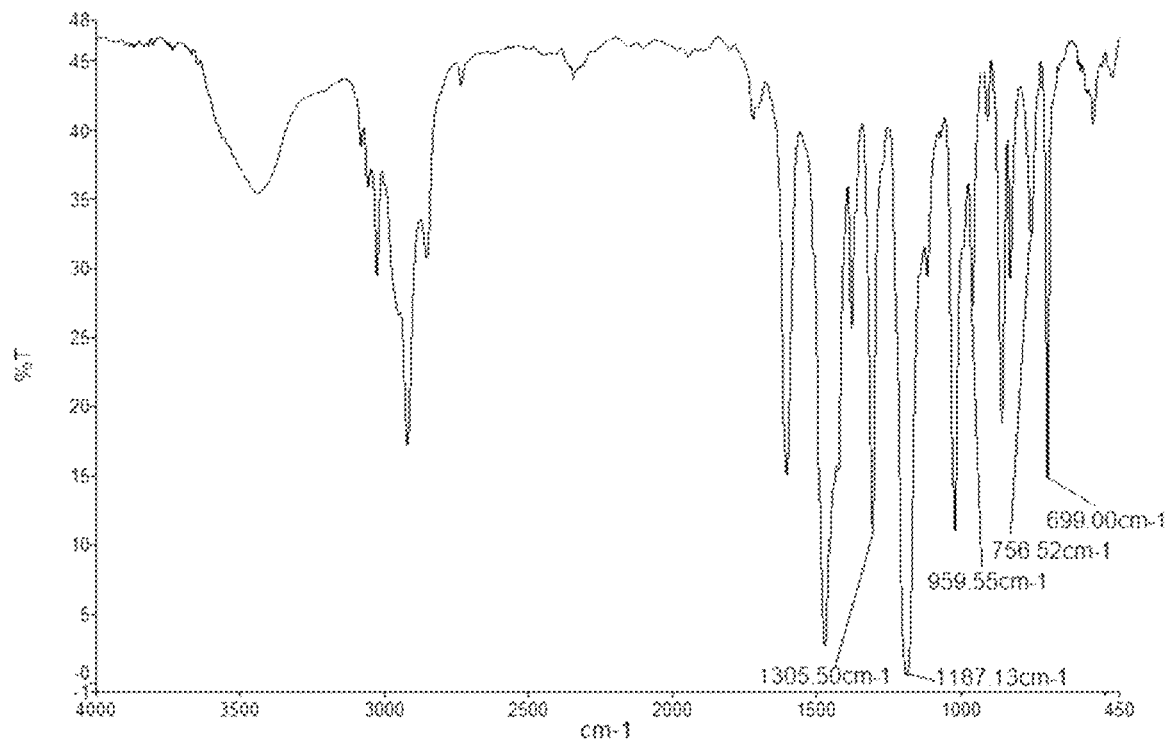
FIG. 2 illustrates the FTIR spectrum of product A1.

Fourier transform infrared spectroscopy (FTIR) was used to analyze the olefin copolymer obtained from Preparation Example 1, i.e., copolymer B1 of styrene and chloromethylstyrene, and product A1, as shown in FIG. 1 and FIG. 2, respectively. In FIG. 1, the peak at 1452.27 $cm^{-1}$ represents the bending vibration characteristic peak of —$CH_2$—, the peak at 1492.93 $cm^{-1}$ represents the bending vibration characteristic peak of benzene C—H of styrene, and the peak at 1267.61 $cm^{-1}$ represents the bending vibration characteristic peak of C—H bond on the 1,4-substituted benzene ring enhanced by —$CH_2Cl$ in chloromethylstyrene, therefore proving that the synthesized product is copolymer B1 of styrene and chloromethylstyrene. In FIG. 2, the peak at 1187.13 $cm^{-1}$ represents the Ar—O—Ar characteristic absorption peak of polyphenylene ether, the peak at 1305.50 $cm^{-1}$ represents the methyl C—H bond characteristic absorption peak of benzene ring of polyphenylene ether, the peaks at 756.52 $cm^{-1}$ and 699.00 $cm^{-1}$ represent the C—H bond characteristic absorption peak of the mono-substituted benzene ring, and the peak at 959.55 $cm^{-1}$ represents the terminal C=C double bond characteristic absorption peak. The characteristic peak of C—H bond on the 1,4-substituted benzene ring enhanced by $CH_2Cl$ at 1267.61 $cm^{-1}$ has disappeared, indicating the completion of a grafting reaction of the copolymer of styrene and chloromethylstyrene and bishydroxyl-terminated polyphenylene ether resin, and the bishydroxyl-terminated polyphenylene ether resin has been completely capped and terminated with the vinyl-containing compound, thereby obtaining the product A1.

Figure 3:
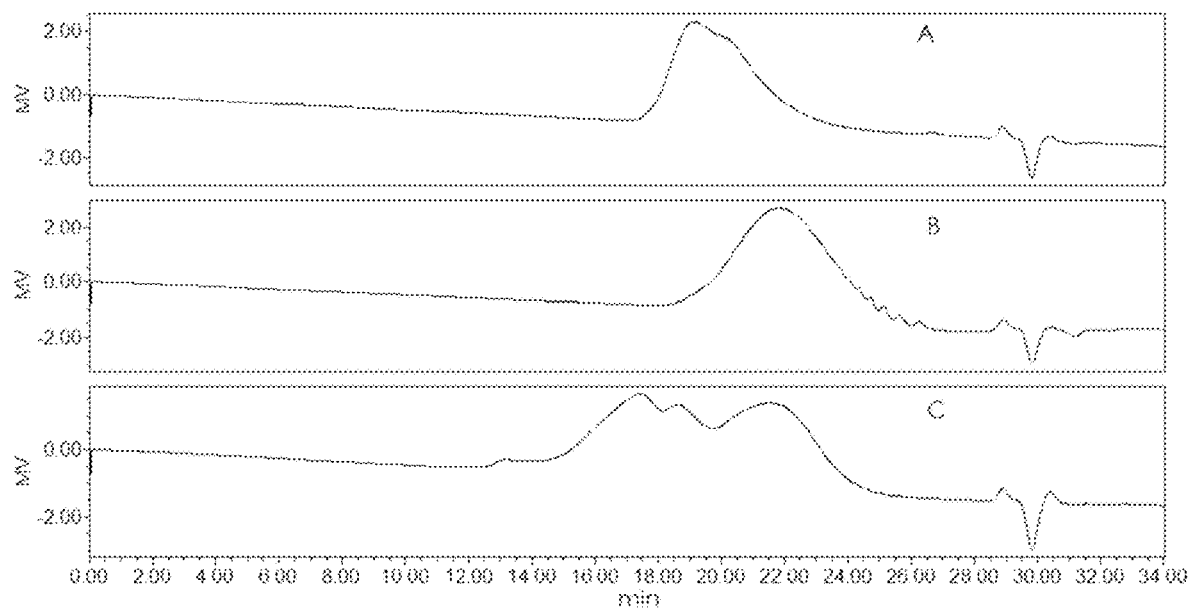
FIG. 3 illustrates the GPC spectrum of product A1.

Gel permeation chromatography (GPC) was used to analyze the copolymer B1 of styrene and chloromethylstyrene and product A1 obtained in Preparation Example 1; as shown in FIG. 3, curve A represents the GPC curve of the copolymer B1 of styrene and chloromethylstyrene, curve B represents the GPC curve of the bishydroxyl-terminated polyphenylene ether resin (SA90), and curve C represents the GPC curve of the product A1. It can be found that the product A1 has a molecular weight of greater than that of the copolymer B1 of styrene and chloromethylstyrene and that of the bishydroxyl-terminated polyphenylene ether resin, indicating a successful reaction of the copolymer of styrene and chloromethylstyrene and the bishydroxyl-terminated polyphenylene ether resin. As such, it is further confirmed that the product obtained is A1, and the number average molecular weight of the product A1 calculated according to curve C is 9601.

At 5-35° C., the product A1 and a solvent MEK were mixed at a mass ratio of 1:1 and well stirred for 1-3 hours to observe the solubility of resin. It is found that the product A1 is fully dissolved to form a tangerine yellow clear solution. Under the same conditions, at 5-35° C., the bishydroxyl-terminated polyphenylene ether resin SA90 and the solvent MEK were mixed at a mass ratio of 1:1 and well stirred for 1-3 hours to observe the solubility of resin. It is found that SA90 can not be fully dissolved, and the resin solution is a brown turbid solution. Under the same conditions, at 5-35° C., the vinylbenzyl-terminated polyphenylene ether resin OPE-2st and the solvent MEK were mixed at a mass ratio of 1:1 and well stirred for 1-3 hours to observe the solubility of resin. It is found that OPE-2st can not be fully dissolved, and the resin solution is a pale brown turbid solution.

Preparation Example 2 Synthesis of Polyphenylene Ether Resin A2

Except that 19.9 g of chloromethylstyrene used in step 3) of Preparation Example 1 was replaced with 10 g of allyl chloride, all processes are the same as in Preparation Example 1, and the synthesized product is pale tangerine yellow solid powder, which is polyphenylene ether resin A2, having a structure of Formula (7), wherein m+n=20-60, and a and b are individually an integer of 1 to 30. The number average molecular weight of the product A2 measured according to GPC is 8521. At 5-35° C., the product A2 and a solvent MEK were mixed at a mass ratio of 1:1 and well stirred for 1-3 hours to observe the solubility of resin. It is found that the product A2 is fully dissolved to form a tangerine yellow clear solution.

Preparation Example 3 Synthesis of Polyphenylene Ether Resin A3

Except that 19.9 g of chloromethylstyrene used in step 3) of Preparation Example 1 was replaced with 13.7 g of methacryloyl chloride, all processes are the same as in Preparation Example 1, and the synthesized product is pale tangerine yellow solid powder, which is polyphenylene ether resin A3, having a structure of Formula (8), wherein m+n=20-60, and a and b are individually an integer of 1 to 30. The number average molecular weight of the product A3 measured according to GPC is 9432. At 5-35° C., the product A3 and a solvent MEK were mixed at a mass ratio of 1:1 and well stirred for 1-3 hours to observe the solubility of resin. It is found that the product A3 is fully dissolved to form a tangerine yellow clear solution.

Preparation Example 4 Synthesis of Polyphenylene Ether Resin A4

Step 1): 4.84 g (0.02 mol) of dibenzoyl peroxide (BPO) was weighed and loaded to a three-necked flask; 200 g of toluene was added and stirred until BPO was fully dissolved, followed by adding 104 g (1.0 mol) of styrene, 30.6 g (0.2 mol) of chloromethylstyrene and a small amount of molecular weight regulator 2,4-diphenyl-4-methyl-1-pentene and continuously stirring, and the reaction was conducted at constant temperature in a 90° C. oil bath with $N_2$ protection for 5 hours. $N_2$ was released upon completion and the reaction was cooled to room temperature. The solution was subject to reduced pressure distillation to remove the solvent toluene and unreacted raw materials and then precipitated in methanol. The solid obtained was subject to suction filtration and dried to obtain white solid powder, which is copolymer B2, a copolymer of styrene and chloromethylstyrene.
Step 2): The synthesized product B2 was all added to a three-necked flask, followed by adding 600 g of toluene and stirring to fully dissolve the copolymer, and then 368 g of a bishydroxyl-terminated polyphenylene ether resin and 48 g of a phase transfer catalyst tetrabutylammonium bromide were added, stirred and fully dissolved. The reaction was conducted under stirring at constant temperature in a 70° C. oil bath with $N_2$ protection, and 40 g of 20% NaOH solution was added dropwise, followed by another 2 hours of reaction at constant temperature and then the temperature was lowered to 40° C.

Step 3): 39.8 g of chloromethylstyrene and 1.0 g of an antioxidant tert-butyl hydroquinone were added to the three-necked flask and continuously stirred. The reaction was conducted at constant temperature in a 60° C. oil bath with $N_2$ protection, and 40 g of 20% NaOH solution was added dropwise, followed by another 1.5 hours of reaction at constant temperature. $N_2$ was released upon completion and the reaction was cooled to room temperature. The solution was neutralized with dilute hydrochloric acid and centrifuged to remove the water phase. The organic phase was precipitated in methanol. The solid obtained was subject to suction filtration and dried to obtain pale tangerine yellow solid powder, which is polyphenylene ether resin A4, having a structure of Formula (6), wherein m+n=20-60, and a and b are individually an integer of 1 to 30.
The number average molecular weight of the product A4 measured according to GPC is 17680. At 5-35° C., the product A4 and a solvent MEK were mixed at a mass ratio of 1:1 and well stirred for 1-3 hours to observe the solubility of resin. It is found that the product A4 is fully dissolved to form a tangerine yellow clear solution.

Preparation Example 5 Synthesis of Polyphenylene Ether Resin A5

Except that 104 g of styrene used in step 1) of Preparation Example 1 was replaced with 160 g of t-butyl styrene, all processes are the same as in Preparation Example 1, and the synthesized product is pale tangerine yellow solid powder, which is polyphenylene ether resin A5, having a structure of Formula (9), wherein p+n=20-60, and a and b are individually an integer of 1 to 30. The number average molecular weight of the product A5 measured according to GPC is 10150. At 5-35° C., the product A5 and a solvent MEK were mixed at a mass ratio of 1:1 and well stirred for 1-3 hours to observe the solubility of resin. It is found that the product A5 is fully dissolved to form a tangerine yellow clear solution.

Preparation Example 6 Synthesis of Polyphenylene Ether Resin A6

Except that 104 g of styrene used in step 1) of Preparation Example 1 was replaced with 52 g of styrene and 80 g of t-butyl styrene, all processes are the same as in Preparation Example 1, and the synthesized product is pale tangerine yellow solid powder, which is polyphenylene ether resin A6, having a structure of Formula (10), wherein m+n+p=20-60, and a and b are individually an integer of 1 to 30. The number average molecular weight of the product A6 measured according to GPC is 10020. At 5-35° C., the product A6 and a solvent MEK were mixed at a mass ratio of 1:1 and well stirred for 1-3 hours to observe the solubility of resin. It is found that the product A6 is fully dissolved to form a tangerine yellow clear solution.

Preparation Example 7 Synthesis of Polyphenylene Ether Resin A7

Except that 104 g of styrene used in step 1) of Preparation Example 1 was replaced with 93.6 g of styrene and 13 g of divinylbenzene, all processes are the same as in Preparation Example 1, and the synthesized product is pale tangerine yellow solid powder, which is polyphenylene ether resin A7, having a structure of Formula (11), wherein m+n+p=20-60, and a and b are individually an integer of 1 to 30. The number average molecular weight of the product A7 measured according to GPC is 12360. At 5-35° C., the product A7 and a solvent MEK were mixed at a mass ratio of 1:1 and well stirred for 1-3 hours to observe the solubility of resin. It is found that the product A7 is fully dissolved to form a tangerine yellow clear solution.

Preparation Example 8 Synthesis of Polyphenylene Ether Resin A8

A biphenyl-bridged bishydroxyl-terminated polyphenylene ether resin PPO-A was prepared as follow: 1 g of $CuBr_2$, 0.4 g of N,N'-di-tert-butylethylenediamine, 12 g of dimethylbutylamine, 0.5 g of tetrabutylammonium bromide, 0.5 g of sodium dodecyl sulfate, and 600 g of toluene were weighed and loaded to a reactor and stirred at 50° C. for 0.5 hour. Then a mixture in methanol containing 135.2 g of 2,2',3,3',5,5'-hexamethyl-4,4'-dihydroxybiphenyl, 305 g of 2,6-dimethylphenol, 0.6 g of N,N'-di-tert-butyl ethylenediamine, 18 g of dimethylbutylamine, and 1.5 g of $CuBr_2$ was slowly added dropwise to a reactor. At a 50° C. constant temperature and in the presence of both high purity $N_2$ and air, the reaction was stirred for 4 hours. After that, 25 g of ethyl enediaminetetraacetic acid tetrasodium salt tetrahydrate aqueous solution was added to the reactor to terminate the reaction, followed by cooling to room temperature. The water phase was separated and removed, and the organic phase was washed with water for several times and then added dropwise to methanol for precipitation; the solid product obtained was subject to suction filtration and dried to obtain the biphenyl-bridged bishydroxyl-terminated polyphenylene ether resin PPO-A, having a structure of Formula (13), wherein $R_4$, $R_5$, $R_8$ to $R_{10}$ and $R_{13}$ to $R_{15}$ are each a methyl group, $R_6$, $R_7$, $R_{11}$ and $R_{12}$ are each a hydrogen atom, A is a covalent bond, and a and b are individually an integer of 1 to 30.

Except that 184 g of bishydroxyl-terminated polyphenylene ether resin used in step 2) of Preparation Example 1 was replaced with 175 g of PPO-A, all processes are the same as in Preparation Example 1, and the synthesized product is pale tangerine yellow solid powder, which is polyphenylene ether resin A8, having a structure of Formula (12), wherein m+n=20-60, and a and b are individually an integer of 1 to 30. The number average molecular weight of the product A8 measured according to GPC is 8762. At 5-35° C., the product A8 and a solvent MEK were mixed at a mass ratio of 1:1 and well stirred for 1-3 hours to observe the solubility of resin. It is found that the product A8 is fully dissolved to form a tangerine yellow clear solution.

Preparation Example 9 Synthesis of Olefin Copolymer A9

9.68 g (0.04 mol) of dibenzoyl peroxide (BPO) was weighed and loaded to a three-necked flask; 400 g of toluene was added and stirred until BPO was fully dissolved, followed by adding 208 g (2 mol) of styrene, 24 g (0.2 mol) of p-hydroxystyrene and a small amount of molecular weight regulator 2,4-diphenyl-4-methyl-1-pentene and continuously stirring, and the reaction was conducted at constant temperature in a 90° C. oil bath with $N_2$ protection for 5 hours. $N_2$ was released upon completion and the reaction was cooled to room temperature. The solution was subject to reduced pressure distillation to remove the solvent toluene and unreacted raw materials and then precipitated in methanol. The solid obtained was subject to suction filtration and dried to obtain white solid powder, which is copolymer B3, a copolymer of styrene and p-hydroxystyrene. The synthesized product B3 was all added to a three-necked flask, followed by adding 400 g of toluene and stirring to fully dissolve the copolymer; then 48 g of tetrabutylammonium bromide and 40 g of 20% NaOH solution were sequentially added, and 39.8 g of chloromethylstyrene and 1.0 g of tert-butyl hydroquinone were added dropwise and continuously stirred. The reaction was conducted at constant temperature in a 60° C. oil bath with $N_2$ protection for 1.5 hours. $N_2$ was released upon completion and the reaction was cooled to room temperature. The solution was neutralized with dilute hydrochloric acid and centrifuged to remove the water phase. The organic phase was precipitated in methanol. The solid obtained was subject to suction filtration and dried to obtain white solid powder, which is olefin copolymer A9, having a structure of Formula (14), wherein m+n=2-100.

The number average molecular weight of the product A9 measured according to GPC is 4680. At 5-35° C., the product A9 and a solvent MEK were mixed at a mass ratio of 1:1 and well stirred for 1-3 hours to observe the solubility of resin. It is found that the product A9 is fully dissolved to form a colorless clear solution.

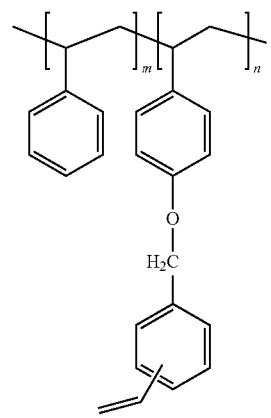

Formula (14)

Preparation Example 10 Synthesis of Olefin Copolymer A10

9.68 g (0.04 mol) of dibenzoyl peroxide (BPO) was weighed and loaded to a three-necked flask; 400 g of toluene was added and stirred until BPO was fully dissolved, followed by adding 208 g (2 mol) of styrene, 30.6 g (0.2 mol) of chloromethylstyrene and a small amount of molecular weight regulator 2,4-diphenyl-4-methyl-1-pentene and continuously stirring, and the reaction was conducted at constant temperature in a 90° C. oil bath with $N_2$ protection for 5 hours. $N_2$ was released upon completion and the reaction was cooled to room temperature. The solution was subject to reduced pressure distillation to remove the solvent toluene and unreacted raw materials and then precipitated in methanol. The solid obtained was subject to suction filtration and dried to obtain white solid powder, which is olefin copolymer A10. The number average molecular weight of the product A10 measured according to GPC is 5380. At 5-35° C., the product A10 and a solvent MEK were mixed at a mass ratio of 1:1 and well stirred for 1-3 hours to observe the solubility of resin. It is found that the product A10 is fully dissolved to form a colorless clear solution.

For the property tests of Examples E1 to E13 and Comparative Examples C1 to C8 listed in Tables 4 to Table 6, samples (specimens) were prepared as described below and tested under specified conditions as follows.

1. Prepreg: Resin composition from each Example (Tables 1-2) or each Comparative Example (Table 3) was individually well-mixed to form a varnish, which was then loaded to an impregnation tank; a fiberglass fabric (e.g., 2116 L-glass fiber fabric or 1080 L-glass fiber fabric, all available from Asahi) was impregnated into the impregnation tank to adhere the resin composition onto the fiberglass fabric, followed by heating at 150° C. to 170° C. to a semi-cured stage (B-stage) to obtain a prepreg.

2. Copper-clad laminate (8-ply, formed by lamination of eight prepregs): Two 18 μm HVLP (hyper very low profile) copper foils and eight prepregs obtained from 2116 L-glass fiber fabrics impregnated with each Example or Comparative Example and having a resin content of about 55% were prepared and stacked in the order of one HVLP copper foil, eight prepregs and one HVLP copper foil, followed by lamination under vacuum at 420 psi and 200° C. for 2 hours to form a copper-clad laminate. Insulation layers between the two copper foils were formed by laminating eight sheets of prepreg, and the resin content of the insulation layers is about 55%.

3. Copper-free laminate (8-ply, formed by lamination of eight prepregs): Each aforesaid copper-clad laminate (8-ply) was etched to remove the two copper foils to obtain a copper-free laminate (8-ply), which is formed by laminating eight sheets of prepreg and has a resin content of about 55%.

4. Copper-free laminate (2-ply, formed by lamination of two prepregs): Two 18 μm HVLP (hyper very low profile) copper foils and two prepregs obtained from 1080 L-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-clad laminate (2-ply, formed by lamination of two prepregs). Next, each copper-clad laminate (2-ply) was etched to remove the copper foils on both sides to obtain a copper-free laminate (2-ply) which is formed by laminating two prepregs and has a resin content of about 70%.

Each sample was analyzed as described below.

1. Varnish Solubility

At 5-35° C., the resin composition from each Example or each Comparative Example listed in Table 1 to Table 3 was used to prepare a varnish and well mixed and stirred for 1-3 hours, and the varnish solubility was observed. If the resin composition was fully dissolved, without turbidity or layer separation, a designation of "OK" is given; if turbidity or layer separation was observed, then the resin composition was not fully dissolved.

2. Laminate Appearance

Figure 4:
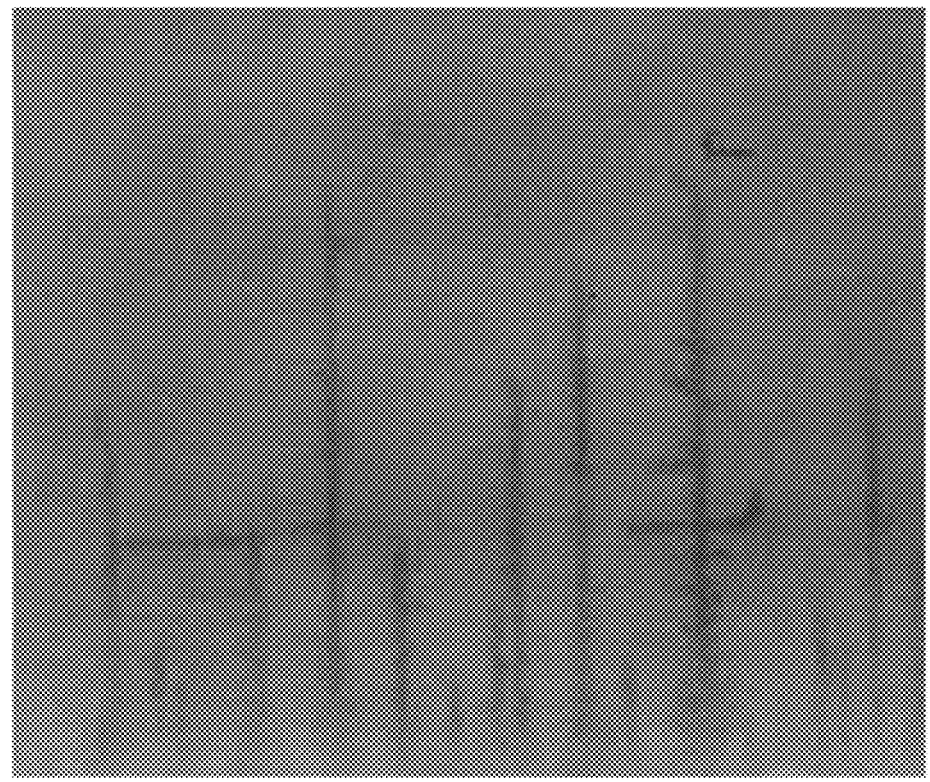
FIG. 4 shows a copper-free laminate with branch-like pattern.
Figure 5:
FIG. 5 shows a copper-free laminate with dry board.
Figure 6:
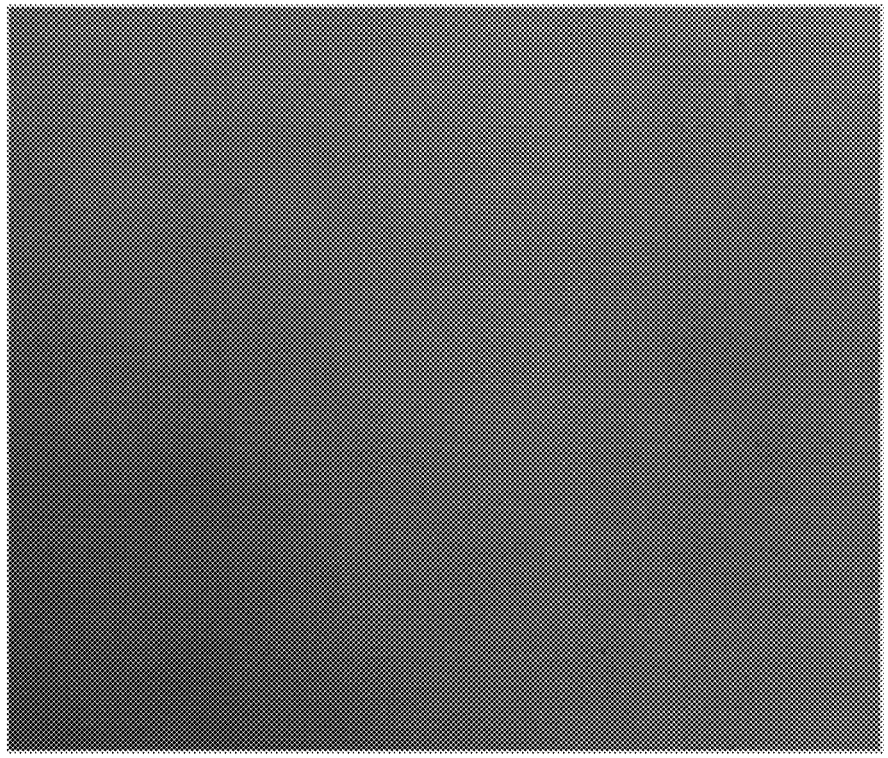
FIG. 6 shows a copper-free laminate without branch-like pattern and without dry board.

A copper-free laminate (8-ply, formed by lamination of eight prepregs) was subject to visual inspection to determine whether a branch-like pattern (abbreviated as "pattern") or dry board is present on its edges; absence of branch-like patterns and dry board on its edges (see FIG. 6) is designated as "OK", and presence of branch-like patterns (see FIG. 4) on its edges or dry board (see FIG. 5) indicates an uneven laminate surface.

3. Glass Transition Temperature (Tg)

A copper-free laminate sample (8-ply) was subject to the glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each specimen. Temperature interval during the measurement was set at 50-400° C. with a temperature increase rate of 2° C./minute; higher glass transition temperature is more preferred.

4. Multi-Layer Board Thermal Resistance

A core was prepared as follow: a prepreg (resin content of about 55%) prepared from a 2116 L-glass fiber fabric impregnated with each Example or each Comparative Example was superimposed on both sides with a piece of 18 μm HVLP copper foil, followed by lamination and curing for 2 hours under vacuum at high temperature (200° C.) and high pressure (420 psi) to obtain a copper-clad core. Then the copper-clad core obtained above was etched to remove the copper foils on both sides so as to obtain a copper-free core (5 mil in thickness). Three copper-free cores were prepared as above. Next, two 18 μm HVLP copper foils and eight prepregs (resin content of about 70%) obtained from 1080 L-glass fiber fabrics impregnated with each Example or Comparative Example were prepared and stacked in the order of one copper foil, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), and one copper foil, followed by lamination under vacuum at 420 psi and 200° C. for 2 hours to form an eight-layer copper-clad laminate. The eight-layer copper-clad laminate was then cut to form a 5.9 inch*2.2 inch rectangular sample, the sample was subject to a circuit board drilling process to form a total of 500 through holes with a diameter of 0.3 mm (i.e., a 20*25 array of through holes, the vertical distance of adjacent hole walls being 0.25 mm), and then the hole walls were copper-plated to obtain a sample for multi-layer board thermal resistance test.

In the multi-layer board thermal resistance test, the aforesaid sample for multi-layer board thermal resistance test was horizontally placed on (i.e., in contact with) the solder bath of a 288° C. solder pot by reference to IPC-TM-650 2.4.13.1; during each test, one surface of the sample was placed on the solder bath for 10 seconds and then removed therefrom and cooled at room temperature for 30 seconds, and then the same surface of the sample was placed on the solder bath for 10 seconds again and then removed and cooled at room temperature for 30 seconds. Each 10 seconds on the solder bath plus 30 seconds of cooling at room temperature is one cycle, and a total of 6 cycles were repeated. Three specimens were tested for each Example or Comparative Example. The sample was sectioned and observed with an optical microscope to determine the presence or absence of delamination. Absence of delamination after 6 floating cycles of all three specimens is designated as "OK" to represent no delamination; presence of delamination after 6 floating cycles of any one specimen is designated as "NG" to represent delamination. As used herein, delamination may refer to interlayer separation or blistering. Delamination may occur between any layers of a laminate. For example, interlayer separation between insulation layers is considered as delamination; for example, blistering or separation between a copper foil and an insulation layer is also considered as delamination.

5. Z-axis ratio of thermal expansion (a.k.a. percent thermal expansion, Z-axis, Z-PTE)

The copper-free laminate (8-ply) sample was subject to thermal mechanical analysis (TMA) during the measurement of the Z-axis ratio of thermal expansion. Each sample was heated from 50° C. to 260° C. at a heating rate of 10°

C./minute and then subject to the measurement of the Z-axis ratio of thermal expansion (in %) in a temperature range of 50° C. to 260° C. by reference to IPC-TM-650 2.4.24.5. Lower Z-axis ratio of thermal expansion is more preferred, and a difference of greater than or equal to 0.1% in the Z-axis ratio of thermal expansion represents a substantial difference.

6. Dissipation Factor (Df)

In the dissipation factor measurement, the copper-free laminate (2-ply) sample was tested by using a microwave dielectrometer available from AET Corp. by reference to JIS C2565 "Measuring methods for ferrite cores for microwave device" at 10 GHz for analyzing each sample. Lower dissipation factor represents better dielectric properties of the sample. Under a 10 GHz frequency, for a Df value of less than 0.005, a difference in Df of less than 0.0001 represents no substantial difference in dissipation factor in different laminates, and a difference in Df value of greater than 0.0001 represents a significant difference (i.e., significant technical difficulty) in dissipation factor in different laminates.

7. Height of Impact Whitening

A drop hammer impact tester (model no. HT-8042A) equipped with a 100 g drop hammer was used. A copper-free laminate (8-ply) sample was subject to falling impact from different heights (from 1 cm to 20 cm) and then observed to determine whether the appearance of the copper-free laminate became whitened. The test began from falling impact from 1 cm; if no apparent whitening was observed from the copper-free laminate, then the sample would be further subject to falling impact from 2 cm and so on, until apparent whitening was observed from the copper-free laminate, and the height causing whitening was recorded. Greater height represents better impact resistance of the copper-free laminate.

8. Copper Foil Peeling Strength (Peeling Strength, P/S)

The aforesaid copper-clad laminate (8-ply) was cut into a rectangular sample with a width of 24 mm and a length of greater than 60 mm, which was etched to remove surface copper foil to leave a rectangular copper foil with a width of 3.18 mm and a length of greater than 60 mm to be tested by using a tensile strength tester by reference to IPC-TM-650 2.4.8 at room temperature (about 25° C.) to measure the force (1b/in) required to separate the copper foil from the insulation layer of the laminate.

TABLE 1

Resin compositions of Examples E1 to E7 (in part by weight)

| Component | | E1 | E2 | E3 | E4 | E5 | E6 | E7 |
|---|---|---|---|---|---|---|---|---|
| polyphenylene ether resin of Formula (1) | A1 | 100 | | | | | | |
| | A2 | | 100 | | | | | |
| | A3 | | | 100 | | | | |
| | A4 | | | | 100 | | | |
| | A5 | | | | | 100 | | |
| | A6 | | | | | | 100 | |
| | A7 | | | | | | | 100 |
| | A8 | | | | | | | |
| conventional polyphenylene ether resin | OPE-2st 2200 | | | | | | | |
| | SA9000 | | | | | | | |
| crosslinking agent | Riocn100 | | | | | | | |
| | TAIC | | | | | | | |
| | BVPE | 25 | 25 | 25 | 25 | 25 | 25 | 25 |
| inorganic filler | SC-2500-SVJ | 100 | 100 | 100 | 100 | 100 | 100 | 100 |
| curing accelerator | 25B | 0.5 | 0.5 | 0.5 | 0.5 | 0.5 | 0.5 | 0.5 |
| solvent | MEK | 150 | 150 | 150 | 150 | 150 | 150 | 150 |

TABLE 2

Resin compositions of Examples E8 to E13 (in part by weight)

| Component | | E8 | E9 | E10 | E11 | E12 | E13 |
|---|---|---|---|---|---|---|---|
| polyphenylene ether resin of Formula (1) | A1 | | 100 | 100 | 100 | 70 | 50 |
| | A2 | | | | | | 10 |
| | A3 | | | | | | 10 |
| | A4 | | | | | | |
| | A5 | | | | | | |
| | A6 | | | | | | |
| | A7 | | | | | 30 | 30 |
| | A8 | 100 | | | | | |
| conventional polyphenylene ether resin | OPE-2st 2200 | | | | 5 | | 10 |
| | SA9000 | | | | | 30 | 10 |
| crosslinking agent | Riocn100 | | | | | | 5 |
| | TAIC | | | | | | 5 |
| | BVPE | 25 | 10 | 40 | 25 | 25 | 20 |
| inorganic filler | SC-2500-SVJ | 100 | 100 | 100 | 100 | 100 | 110 |
| curing accelerator | 25B | 0.5 | 0.5 | 0.5 | 0.5 | 0.5 | 0.6 |
| solvent | MEK | 150 | 150 | 150 | 150 | 150 | 150 |

TABLE 3

Resin compositions of Comparative Examples C1 to C8 (in part by weight)

| Component | | C1 | C2 | C3 | C4 | C5 | C6 | C7 | C8 |
|---|---|---|---|---|---|---|---|---|---|
| conventional polyphenylene ether resin | SA90 | 100 | | | | 60 | | | |
| | OPE-2st 2200 | | 100 | | | | | 50 | 50 | 50 |
| | SA9000 | | | 100 | | | | | |
| crosslinking agent | A9 | | | | 100 | 40 | 50 | | |
| | A10 | | | | | | | 50 | |
| | Riocn100 | | | | | | | | 50 |
| | BVPE | 25 | 25 | 25 | 25 | 25 | 25 | 25 | 25 |
| inorganic filler | SC-2500-SVJ | 100 | 100 | 100 | 100 | 100 | 100 | 100 | 100 |
| curing accelerator | 25B | 0.5 | 0.5 | 0.5 | 0.5 | 0.5 | 0.5 | 0.5 | 0.5 |
| solvent | MEK | 150 | 150 | 150 | 150 | 150 | 150 | 150 | 150 |

TABLE 4

Test results of articles made from resin compositions of Examples E1 to E7

| Item | Unit | E1 | E2 | E3 | E4 | E5 | E6 | E7 |
|---|---|---|---|---|---|---|---|---|
| varnish solubility | — | OK | OK | OK | OK | OK | OK | OK |
| laminate appearance | — | OK | OK | OK | OK | OK | OK | OK |
| Tg | °C. | 220 | 212 | 218 | 222 | 223 | 221 | 226 |
| multi-layer board thermal resistance | — | OK | OK | OK | OK | OK | OK | OK |
| Z-PTE | % | 2.1 | 2.2 | 2.1 | 1.9 | 2.0 | 2.0 | 1.8 |
| Df | — | 0.0016 | 0.0016 | 0.0016 | 0.0017 | 0.0016 | 0.0016 | 0.0015 |
| height of impact whitening | cm | 15 | 17 | 16 | 13 | 14 | 14 | 16 |
| P/S | lb/in | 3.2 | 3.1 | 3.4 | 3.3 | 3.2 | 3.2 | 3.2 |

TABLE 5

Test results of articles made from resin compositions of Examples E8 to E13

| Item | Unit | E8 | E9 | E10 | E11 | E12 | E13 |
|---|---|---|---|---|---|---|---|
| varnish solubility | — | OK | OK | OK | OK | OK | OK |
| laminate appearance | — | OK | OK | OK | OK | OK | OK |
| Tg | °C. | 222 | 210 | 230 | 222 | 220 | 221 |
| multi-layer board thermal resistance | — | OK | OK | OK | OK | OK | OK |
| Z-PTE | % | 2.0 | 2.2 | 1.8 | 2.1 | 2.1 | 2.0 |
| Df | — | 0.0016 | 0.0017 | 0.0015 | 0.0017 | 0.0017 | 0.0016 |
| height of impact whitening | cm | 13 | 15 | 15 | 17 | 18 | 20 |
| P/S | lb/in | 3.3 | 3.1 | 3.3 | 3.3 | 3.6 | 3.7 |

TABLE 6

Test results of articles made from resin compositions of Comparative Examples C1 to C8

| Item | Unit | C1 | C2 | C3 | C4 | C5 | C6 | C7 | C8 |
|---|---|---|---|---|---|---|---|---|---|
| varnish solubility | — | turbid | turbid | OK | OK | turbid | turbid | turbid | turbid |
| laminate appearance | — | pattern | dry board | OK | OK | pattern | dry board | pattern | OK |
| Tg | °C. | 189 | 225 | 217 | 208 | 199 | 213 | 193 | 215 |
| multi-layer board thermal resistance | — | NG | NG | NG | NG | NG | NG | NG | NG |
| Z-PTE | % | 2.7 | 2.0 | 2.2 | 2.5 | 2.6 | 2.3 | 3.1 | 2.3 |
| Df | — | 0.0049 | 0.0020 | 0.0019 | 0.0016 | 0.0032 | 0.0018 | 0.0046 | 0.0018 |
| height of impact whitening | cm | 3 | 7 | 8 | 5 | 5 | 7 | 8 | 13 |
| P/S | lb/in | 3.1 | 2.8 | 3.3 | 2.3 | 2.7 | 2.6 | 2.9 | 3.1 |

The following observations can be made from Table 1 to Table 6.

Comparison of resin compositions containing the polyphenylene ether resin of Formula (1) according to the present disclosure (i.e., Examples E1 to E8) with Comparative Examples which use a conventional polyphenylene ether resin (such as Comparative Example C1 using a bishydroxyl-terminated polyphenylene ether resin, Comparative Example C2 using a vinylbenzyl-terminated polyphenylene ether resin, and Comparative Example C3 using a methacrylate-terminated polyphenylene ether resin), it can be found that Examples E1 to E8 all achieve excellent multi-layer board thermal resistance and excellent height of impact whitening in addition to the desirable properties such as fully dissolvable varnish, absence of pattern or dry board on laminate appearance, high glass transition temperature, low dissipation factor and low Z-axis ratio of thermal expansion.

Comparison of the resin composition containing the polyphenylene ether resin of Formula (1) according to the present disclosure (e.g., Example E1) and Comparative Example C4 which contains the olefin copolymer A9 without containing a polyphenylene ether resin, it can be found that Example E1 achieves excellent multi-layer board thermal resistance, excellent height of impact whitening, low Z-axis ratio of thermal expansion and high copper foil peeling strength.

Comparison of resin compositions containing the polyphenylene ether resin of Formula (1) according to the present disclosure (i.e., Examples E1 to E8) with Comparative Examples which use a conventional polyphenylene ether resin in conjunction with an olefin copolymer (such as Comparative Example C5 containing the bishydroxyl-terminated polyphenylene ether resin and the olefin copolymer A9, Comparative Example C6 containing the vinylbenzyl-terminated polyphenylene ether resin and the olefin copolymer A9, Comparative Example C7 containing the vinylbenzyl-terminated polyphenylene ether resin and the olefin copolymer A10, and Comparative Example C8 containing the vinylbenzyl-terminated polyphenylene ether resin and the butadiene-styrene copolymer), it can be found that Examples E1 to E8 all achieve excellent multi-layer board thermal resistance, excellent height of impact whitening, and fully dissolvable varnish, in addition to the desirable properties such as absence of pattern or dry board on laminate appearance, high glass transition temperature, low dissipation factor and low Z-axis ratio of thermal expansion.

Overall, articles made from resin compositions containing the polyphenylene ether resin of Formula (1) according to the present disclosure and a crosslinking agent can achieve excellent multi-layer board thermal resistance and excellent height of impact whitening in addition to the desirable properties such as fully dissolvable varnish, absence of pattern or dry board on laminate appearance, high glass transition temperature, low dissipation factor, low Z-axis ratio of thermal expansion and high copper foil peeling strength.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A polyphenylene ether resin of Formula (1):

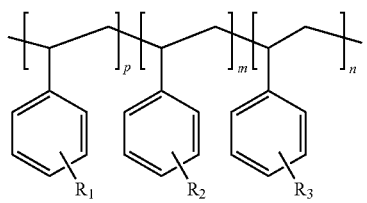

wherein m, n and p are individually an integer of 0-100, m+n+p=2-100, and at least two of m, n and p are not 0 at the same time;

$R_1$ to $R_3$ are individually a hydrogen atom, a C1-C6 hydrocarbyl group or a structure of Formula (2), and at least one of $R_1$ to $R_3$ is the structure of Formula (2):

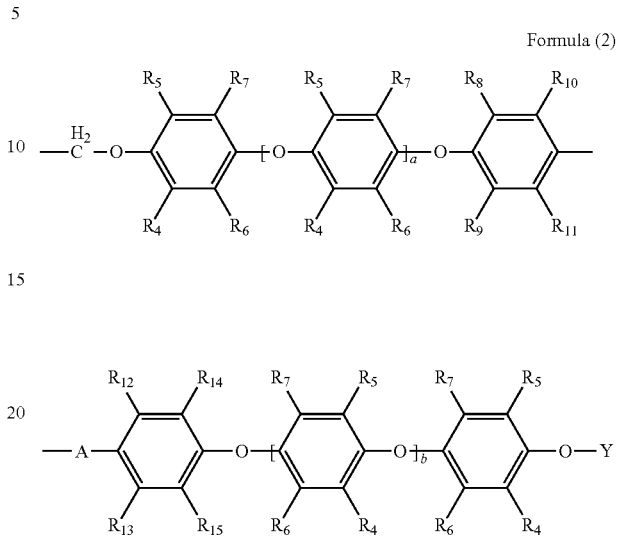

$R_4$ to $R_{15}$ are individually a hydrogen atom or a C1-C6 alkyl group;

A is a covalent bond or a C1-C3 hydrocarbyl group;

a and b are individually an integer of 1-30;

Y is Formula (3), Formula (4) or Formula (5):

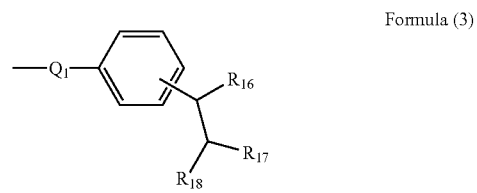

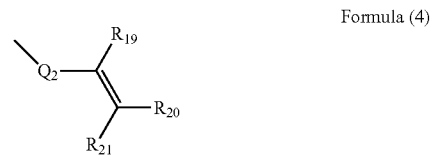

wherein $R_{16}$ to $R_{22}$ are individually a hydrogen atom or a C1-C6 alkyl group; and $Q_1$ and $Q_2$ are individually a C1-C6 hydrocarbyl group or not present.

2. The polyphenylene ether resin of claim 1, comprising any one of Formulas (6)-(12) or a combination thereof:
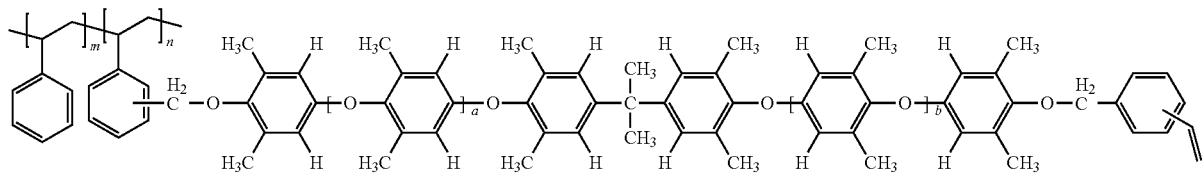
Formula (6)
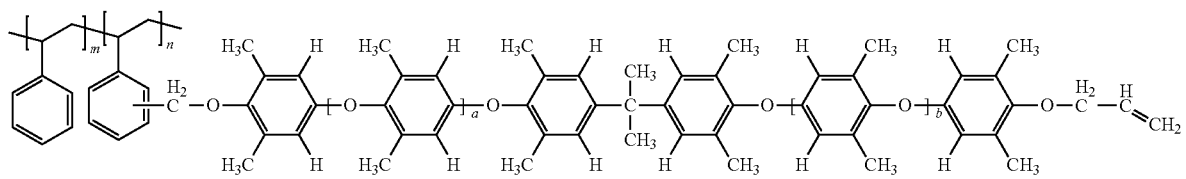
Formula (7)
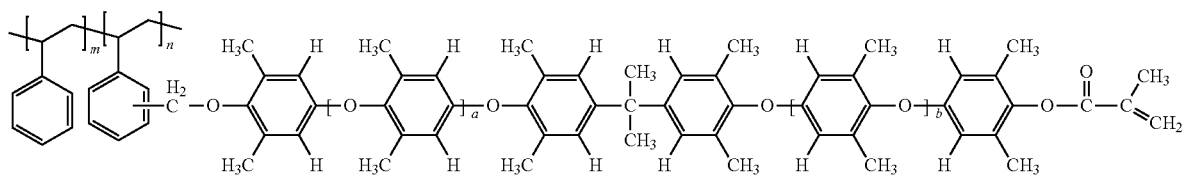
Formula (8)
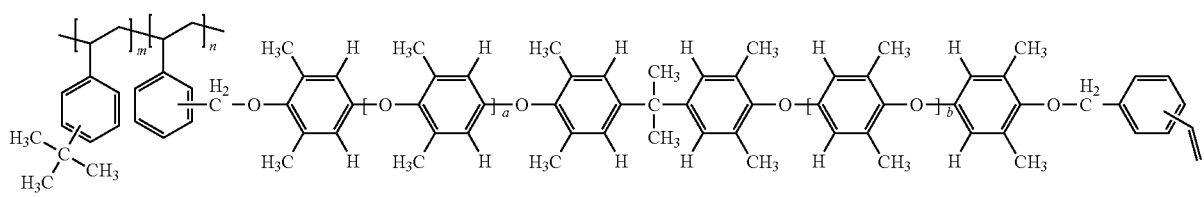
Formula (9)
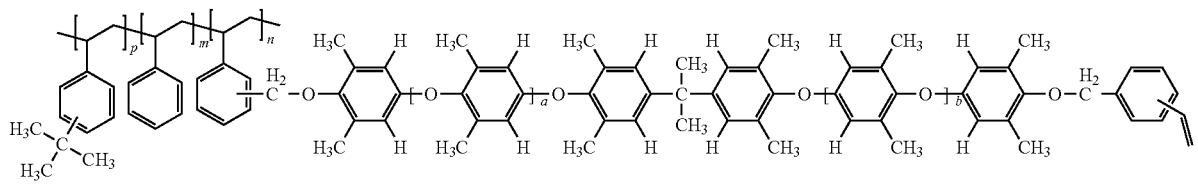
Formula (10)
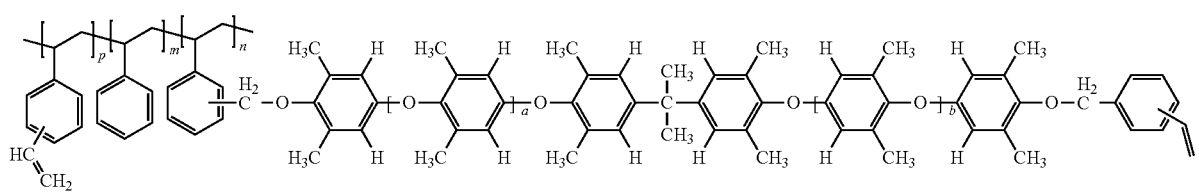
Formula (11)
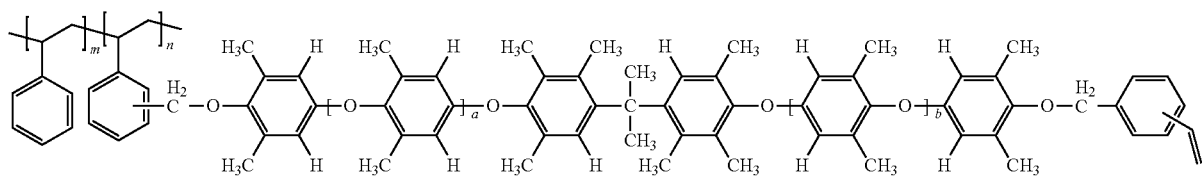
Formula (12)

wherein m, n and p are individually an integer of 0 to 100;
in Formula (6), Formula (7), Formula (8) and Formula (12), m≠0, n≠0, and m+n=2-100;
in Formula (9), m≠0, n≠0, and n+p=2-100;
in Formula (10) and Formula (11), m≠0, p≠0, n≠0, and m+n+p=3-100; and
a and b are individually an integer of 1 to 30.

3. A method of preparing the polyphenylene ether resin of claim 1, comprising the following steps:
1) subjecting a styrene and/or a styrene derivative and a methyl styrene halide to a free radical polymerization reaction to obtain an olefin copolymer;
2) subjecting the olefin copolymer obtained from step 1) and a bishydroxyl-terminated polyphenylene ether resin to a halogenation reaction to obtain a hydroxyl-terminated comb-shaped polyphenylene ether resin; and
3) reacting the hydroxyl-terminated comb-shaped polyphenylene ether resin obtained from step 2) with a vinyl-containing halide to obtain the polyphenylene ether resin of claim 1;
wherein:
the styrene derivative comprises a C1-C6 hydrocarbyl group substituted styrene;
the bishydroxyl-terminated polyphenylene ether resin has a structure of Formula (13):

Formula (13)

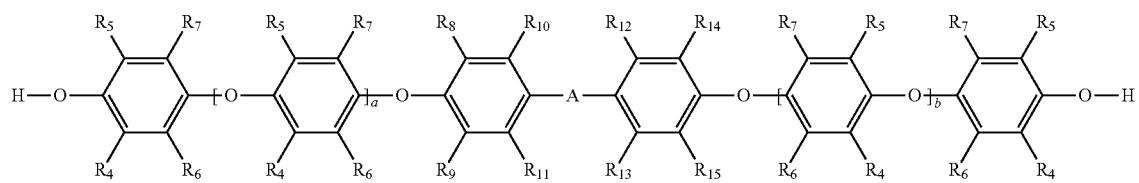

wherein $R_4$ to $R_{15}$ are individually a hydrogen atom or a C1-C6 alkyl group;
A is a covalent bond or a C1-C3 hydrocarbyl group;
a and b are individually an integer of 1 to 30;
the vinyl-containing halide is a halide having a structure of Formula (3), Formula (4) or Formula (5):

Formula (3)

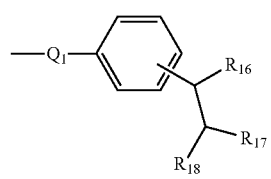

Formula (4)

Formula (5)

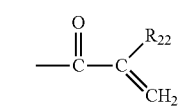

wherein $R_{16}$ to $R_{22}$ are individually a hydrogen atom or a C1-C6 alkyl group; and $Q_1$ and $Q_2$ are individually a C1-C6 hydrocarbyl group or not present.

4. The method of claim 3, wherein:
in step 1), a molar ratio of the styrene and/or the styrene derivative to the methyl styrene halide is 20:1 to 1:1;
the molar ratio of the bishydroxyl-terminated polyphenylene ether resin in step 2) to the methyl styrene halide in step 1) is 0.5:1 to 5:1; and
the molar ratio of the vinyl-containing halide in step 3) to the bishydroxyl-terminated polyphenylene ether resin in step 2) is 5:1 to 1:1.

5. The method of claim 3, wherein:
an initiator, a molecular weight regulator and a solvent are added in step 1);
a phase transfer catalyst, a solvent and an alkaline solution are added in step 2);
an antioxidant and an alkaline solution are added in step 3); and
a reaction temperature of the method is 50-100° C., a reaction time of step 1) is 2-12 hours, and a reaction time of step 2) and step 3) is independently 1-8 hours.

6. A resin composition, comprising 100 parts by weight of the polyphenylene ether resin of claim 1 and 10-40 parts by weight of a crosslinking agent.

7. The resin composition of claim 6, wherein the crosslinking agent comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate, polyolefin, maleimide resin or a combination thereof.

8. The resin composition of claim 6, comprising 1-100 parts by weight of an additive relative to 100 parts by weight of the polyphenylene ether resin, wherein the additive comprises benzoxazine resin, cyanate ester resin, organic silicone resin, epoxy resin, active ester, phenolic resin, styrene maleic anhydride resin, amine curing agent, polyamide, polyimide or a combination thereof.

9. The resin composition of claim 6, further comprising flame retardant, inorganic filler, curing accelerator, polymerization inhibitor, solvent, silane coupling agent, surfactant, coloring agent, toughening agent or a combination thereof.

10. An article made from the resin composition of claim 6, comprising a prepreg, a resin film, a laminate, or a printed circuit board.

11. The article of claim 10, having a glass transition temperature as measured by using a dynamic mechanical analyzer by reference to IPC-TM-650 2.4.24.4 of greater than or equal to 210° C.

12. The article of claim 10, characterized in that no delamination occurs after subjecting the article to a multi-layer board thermal resistance test by reference to IPC-TM-650 2.4.13.1.

13. The article of claim 10, having a Z-axis ratio of thermal expansion as measured by using a thermomechanical analyzer by reference to IPC-TM-650 2.4.24.5 of less than or equal to 2.2%.

14. The article of claim 10, having a dissipation factor at 10 GHz as measured by reference to JIS C2565 of less than or equal to 0.0017.

15. The article of claim 10, having a height of impact whitening as measured by using a drop hammer impact tester of greater than or equal to 13 cm.

16. The article of claim 10, having a copper foil peeling strength as measured by using a tensile strength tester by reference to IPC-TM-650 2.4.8 of greater than or equal to 3.0 lb/in.

* * * * *